United States Patent
Ito

(10) Patent No.: US 9,194,964 B2
(45) Date of Patent: Nov. 24, 2015

(54) RADIOGRAPHIC IMAGING DEVICE, METHOD FOR ACHIEVING PIXEL VALUE, AND NON-TRANSITORY COMPUTER READABLE MEDIUM

(71) Applicant: FUJIFILM Corporation, Tokyo (JP)

(72) Inventor: Takaaki Ito, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 98 days.

(21) Appl. No.: 14/036,146

(22) Filed: Sep. 25, 2013

(65) Prior Publication Data

US 2014/0084175 A1   Mar. 27, 2014

(30) Foreign Application Priority Data

Sep. 27, 2012  (JP) .................. 2012-214263

(51) Int. Cl.
*G01T 1/24* (2006.01)
*H04N 5/32* (2006.01)
*H04N 5/367* (2011.01)

(52) U.S. Cl.
CPC .. *G01T 1/24* (2013.01); *H04N 5/32* (2013.01); *H04N 5/367* (2013.01)

(58) Field of Classification Search
None
See application file for complete search history.

(56) References Cited

U.S. PATENT DOCUMENTS

| 8,513,611 B2 | 8/2013 | Okada |
| 2012/0001079 A1 | 1/2012 | Okada |

FOREIGN PATENT DOCUMENTS

| JP | 2012-15913 A | 1/2012 |
| WO | WO 2011119466 A2 * | 9/2011 |

* cited by examiner

*Primary Examiner* — Constantine Hannaher
(74) *Attorney, Agent, or Firm* — McGinn IP Law Group PLLC

(57) ABSTRACT

A radiation imaging device including: a radiation amount detection pixel that generates charges in amounts corresponding to irradiated radiation amounts, a charge amplifier that accumulates charges provided from the radiation amount detection pixel, and that outputs output signals with signal levels corresponding to accumulated charge amounts; an acquisition section that acquires an output value of the charge amplifier at a time when a first accumulation duration has passed from an accumulation being started, as a first detection value, and that acquires an output value of the charge amplifier at a time when a second accumulation duration has passed from an accumulation being started, as a second detection value; and a derivation section that derives a difference between the first detection value and the second detection value as a pixel value of the radiation amount detection pixel.

9 Claims, 15 Drawing Sheets

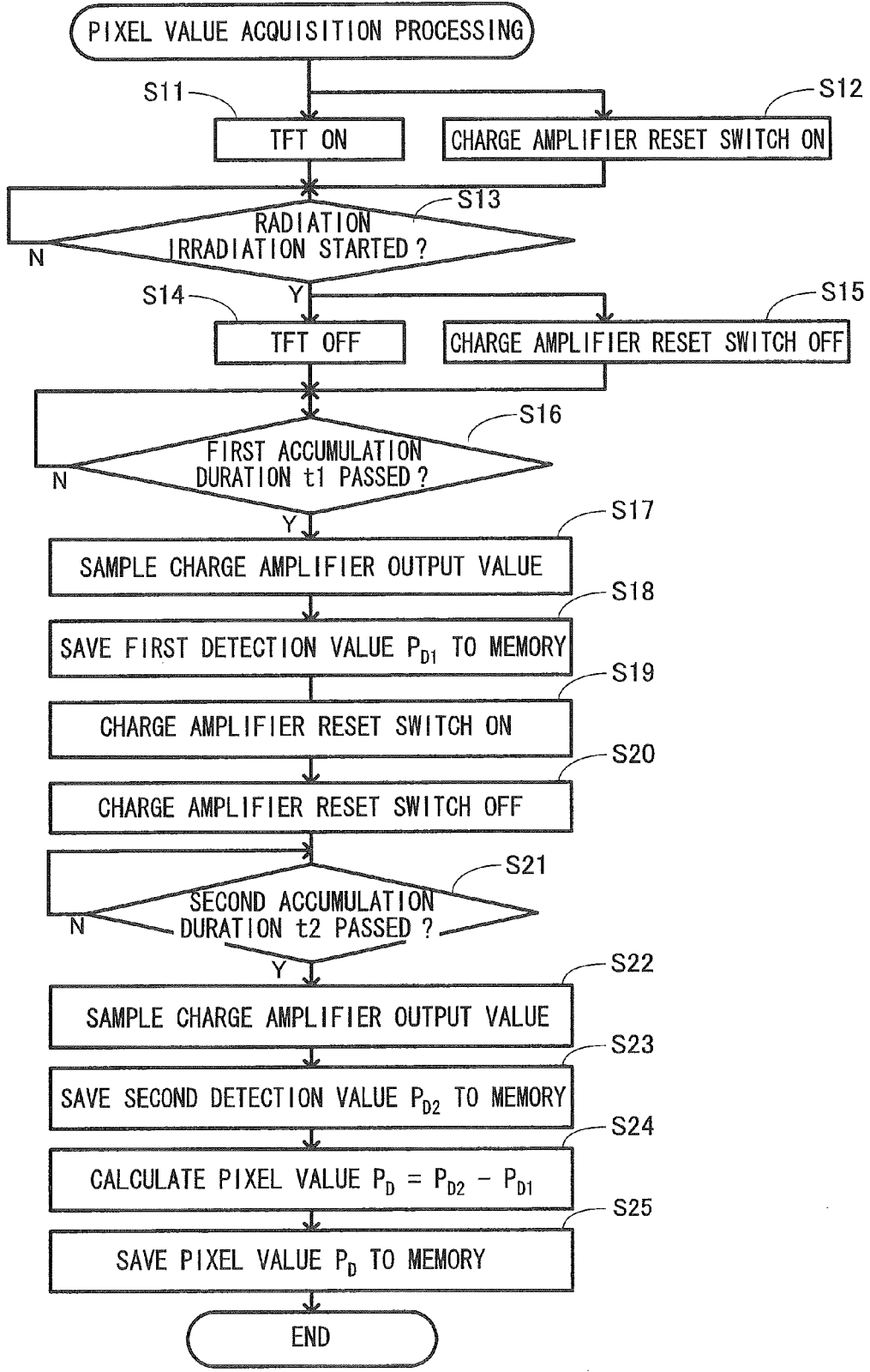

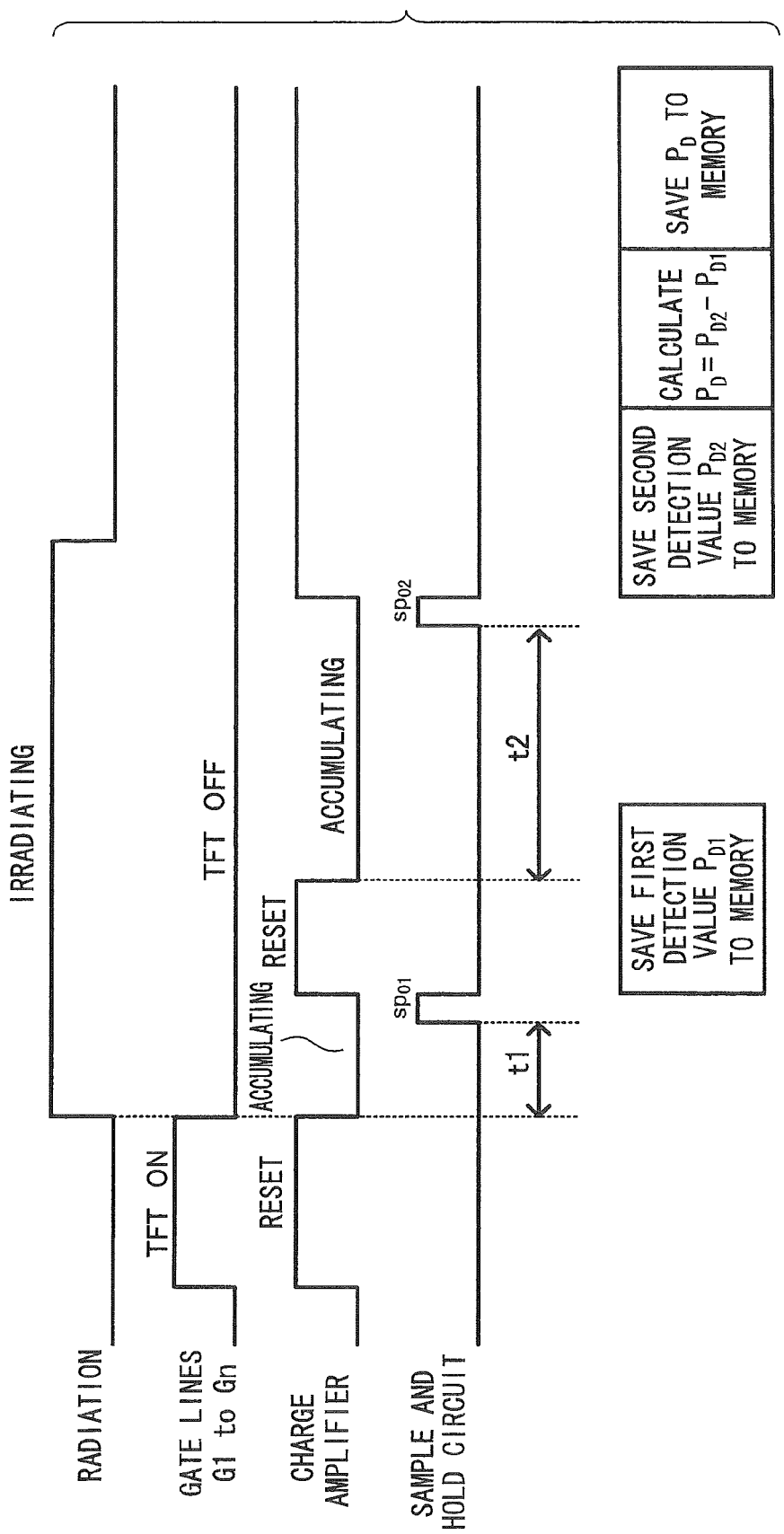

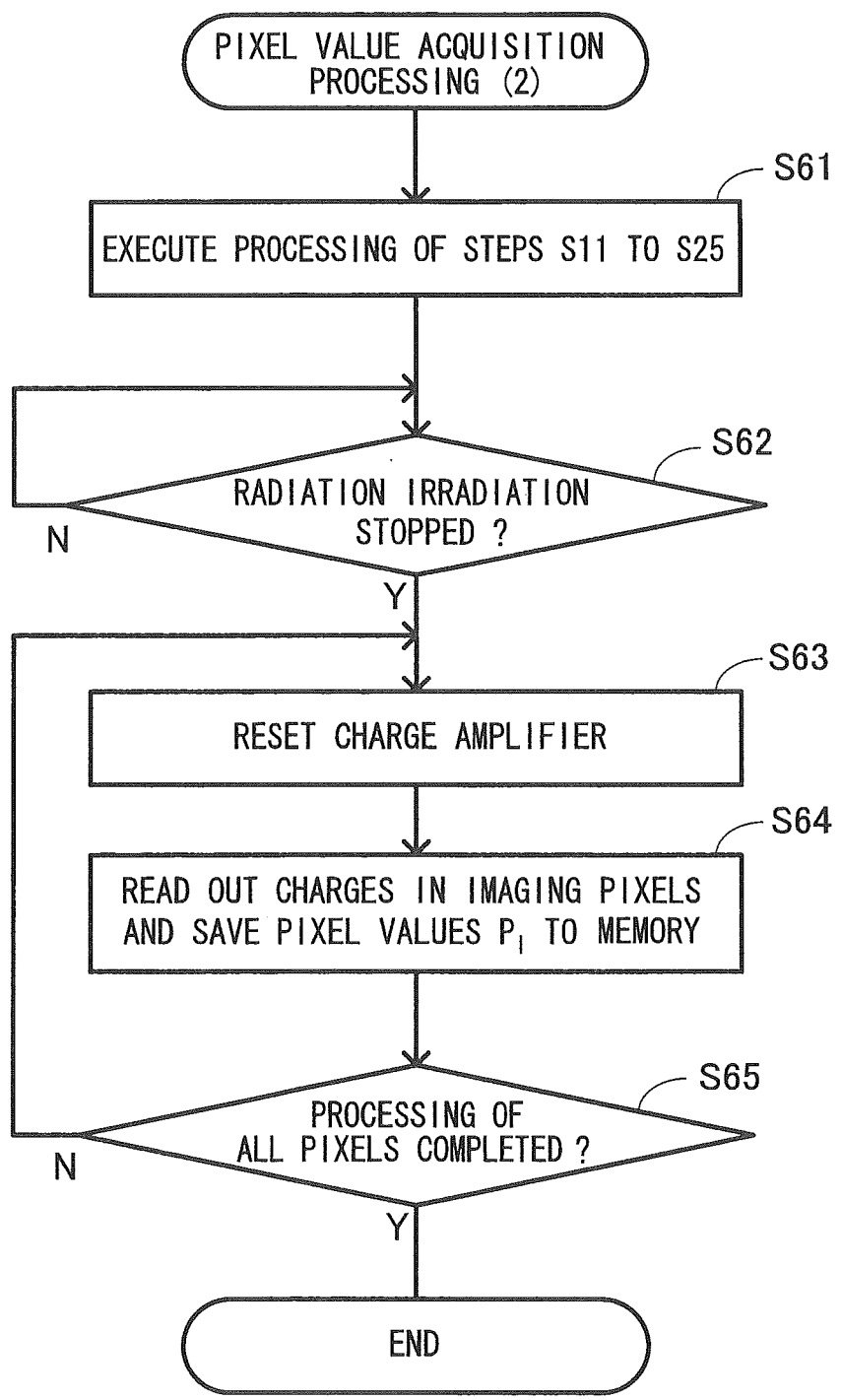

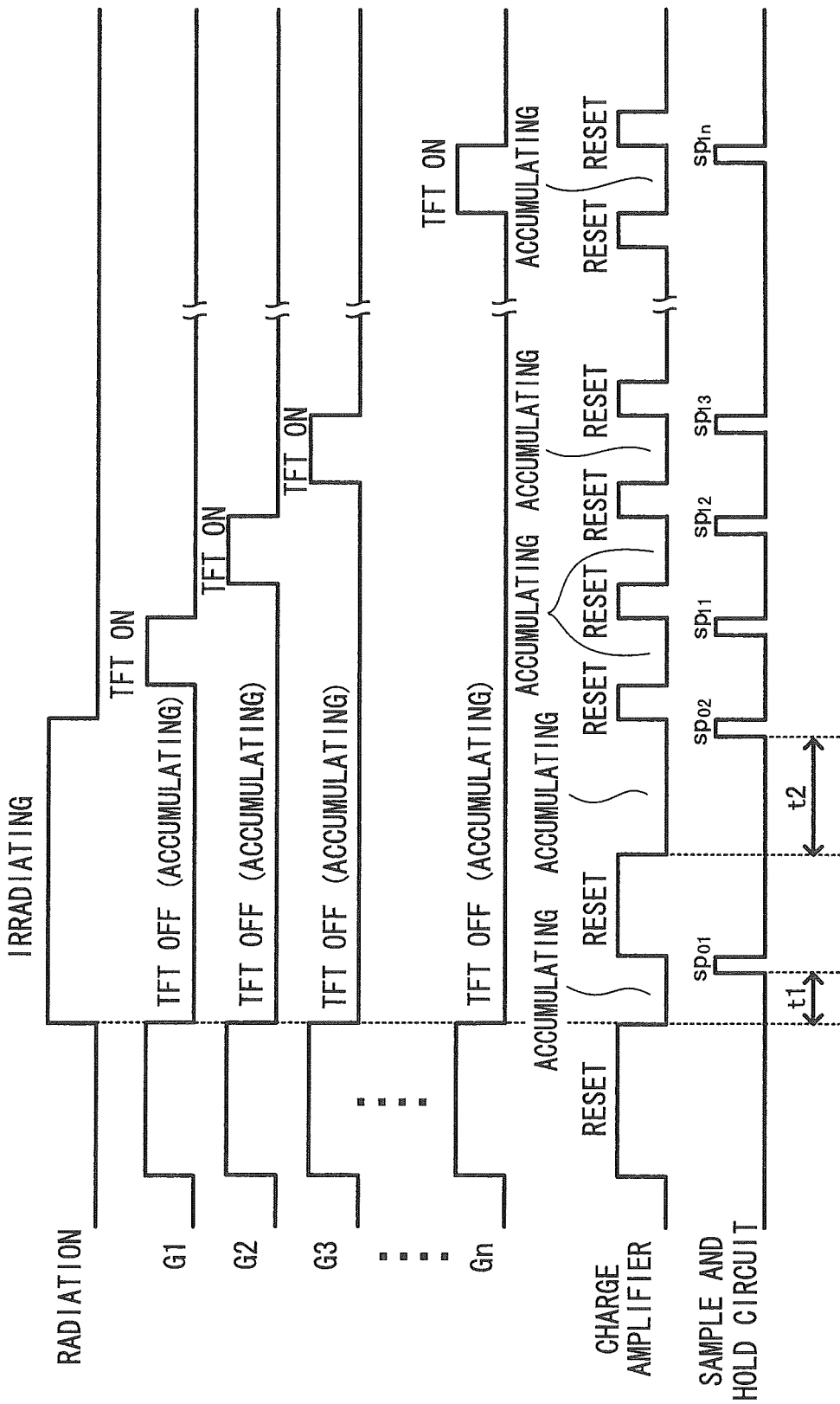

RADIOGRAPHIC IMAGING DEVICE, METHOD FOR ACHIEVING PIXEL VALUE, AND NON-TRANSITORY COMPUTER READABLE MEDIUM

CROSS-REFERENCE TO RELATED APPLICATION

This application claims priority under 35 USC 119 from Japanese Patent Application No. 2012-214263, filed on Sep. 27, 2012 the disclosure of which is incorporated by reference herein.

BACKGROUND OF THE INVENTION

1. Field of the Invention

The present invention relates to a radiation imaging device that images a radiation image expressed by radiation that has passed through an imaging subject, to a non-transitory computer readable medium that stores a program for controlling the radiation imaging device, and to a pixel value acquisition method of the radiation imaging device.

2. Description of the Related Art

Recently, radiation detectors such as flat panel detectors (FPD) and the like have been realized. In an FPD, a radiation-sensitive layer is disposed on a thin film transistor (TFT) active matrix substrate. The FPD is capable of converting radiation directly to digital data. A radiation imaging device, such as an electronic cassette or the like, that uses this radiation detector to image radiation images expressed by irradiated radiation has been realized. A system for converting radiation to electronic signals in the radiation detector may be an indirect conversion system that first converts the radiation to light using a scintillator and then converts the light to electric charges with photodiodes, or a direct conversion system that converts the radiation to charges in a semiconductor layer containing amorphous selenium or suchlike, or the like. Whatever the system, there are a variety of materials that may be used in a semiconductor layer.

When a radiation image is imaged using a radiation detector, excellent image quality must be assured even while a radiation amount of radiation that is irradiated at an imaging subject is minimized. To acquire a radiation image with excellent image quality, exposure control conditions at a radiation source must be set such that radiation is exposed in a radiation amount that is suitable for an imaging target location. Accordingly, a radiation imaging system has been proposed in which a radiation detector is equipped with an automatic exposure control (AEC) function that detects aggregated radiation amounts of radiation being irradiated thereon after passing through an imaging subject, and that controls a stop timing of the irradiation of radiation from the radiation source on the basis of the detection results. To implement this automatic exposure control (AEC), it has been proposed that pixels for detecting aggregated radiation amounts of irradiated radiation be embedded in the radiation detector, in addition to pixels that are for imaging radiation images.

For example, Japanese Patent Application Laid-Open (JP-A) No. 2012-15913 recites a radiation imaging device in which plural pixels, including pixels for radiation image imaging and pixels for radiation amount detection, are arranged in the form of a matrix in a detection region in which radiation is to be detected, and radiation amounts of irradiated radiation are detected by charges that flow through signal lines connected to the pixels for radiation amount detection being detected.

In a radiation detector with radiation detection pixels for detecting radiation amounts of irradiated radiation, as recited in the above described JP-A No. 2012-15913, if there are defects among the radiation amount detection pixels, it may not be possible to obtain normal pixel values from the defective pixels. If automatic exposure control (AEC) is conducted on the basis of pixel values from these defective pixels, it may not be possible to stop the exposure of radiation at an appropriate timing. Hence, the radiation amount of radiation irradiated at an imaging subject may be excessive or the radiation amount may be insufficient and it may not be possible to obtain a suitable radiation image. Therefore, a process can be considered of: detecting defects occurring among the radiation amount detection pixels in advance; creating and storing a defect map; when actually conducting automatic exposure control (AEC), identifying defective pixels by referring to the defect map; and applying processing to exclude or correct pixel values of the identified defective pixels, or the like.

However, accurately detecting defects at radiation amount detection pixels is not easy in the configuration of a radiation detector (FPD). Namely, in a configuration in which signal lines are shared as transmission paths of charges generated at the radiation amount detection pixels and at the imaging pixels, pixel values of the radiation amount detection pixels and imaging pixels must be separated, and the pixel values of the radiation amount detection pixels alone must be extracted. Further, in a configuration that uses devices such as charge amplifiers and the like for converting the charges generated at pixels to electronic signals, offset components of the devices are superimposed on the pixel values, and there may be cases in which accurate pixel values cannot be obtained. Further still, there are cases in which the radiation amount detection pixels are formed with smaller sizes than the imaging pixels, as a result of which pixel values obtained from the radiation amount detection pixels are smaller and the signal-to-noise ratio is lower. Further yet, in a configuration in which charges are read out from sets of plural radiation amount detection pixels connected to the same signal line, signals from defective pixels may be obscured by signals from normal pixels.

Thus, when defects of radiation amount detection pixels are detected and pixel values thereof acquired, signal components of imaging pixels, offset components of various devices and the like are superimposed on these pixel values. Therefore, it is difficult to acquire accurate pixel values of the radiation amount detection pixels. If the radiation amount detection pixels are small in size and the pixel values thereof are small, and the detection of defects among the radiation amount detection pixels may even become more difficult.

The present invention provides a radiation imaging device that may improve the detection accuracy of defective pixels by acquiring accurate pixel values of radiation amount detection pixels, a non-transitory computer readable medium storing a program for controlling this radiation imaging device, and a pixel value acquisition method.

SUMMARY OF THE INVENTION

A first aspect of the present invention is a radiation imaging device including: a radiation amount detection pixel that generates charges in amounts corresponding to radiation amounts of irradiated radiation; a charge amplifier that accumulates charges provided from the radiation amount detection pixel via a signal line, and that outputs output signals with signal levels corresponding to accumulated charge amounts; an acquisition section that acquires an output value of the charge amplifier at a point in time when a first accumulation duration has passed from an accumulation being started, as a first detection value, and that acquires an output value of the charge amplifier at a point in time when a second accumulation duration, different from the first accumulation duration, has passed from an accumulation being started, as a second detection value; and a derivation section that derives a difference between the first detection value and the second detection value as a pixel value of the radiation amount detection pixel.

Namely, by taking the difference between the second detection value and the first detection value, the first aspect of the present invention may remove offset components caused by charge amplifiers and the like. Thus, the first aspect of the present invention may acquire pixel values of the radiation amount detection pixels that contain only signal components based on charges generated at the radiation amount detection pixels.

In a second aspect of the present invention, in the above aspect, the radiation amount detection pixel may be directly connected to the signal line.

In a third aspect of the present invention, in the above aspects, the charge amplifier may include a reset switch that, in an ON state, discharges the accumulated charges from the charge amplifier and that, in an OFF state, starts the accumulation of the charges at the charge amplifier, and the acquisition section may determine the respective points in time at which the first accumulation duration and the second accumulation duration have passed by timing from points in time at which the reset switch switches to the OFF state.

Namely, the third aspect of the present invention sets the point in time at which the reset switch is turned OFF as the start time of the accumulation of charges at the charge amplifier.

In a fourth aspect of the present invention, in the above aspects, wherein the acquisition section may acquire the first detection value, then may put the reset switch into the ON state, and thereafter may put the reset switch into the OFF state and acquires the second detection value.

Namely, the fourth aspect of the present invention sequentially accumulates charges with the charge amplifier, and sequentially acquires the first detection value and the second detection value.

A fifth aspect of the present invention, in the above aspects, may further include: a determination section that determines whether there is a defect at the radiation amount detection pixel on the basis of the pixel value of the radiation amount detection pixel derived by the derivation section; and a defect map creation section that creates a defect map associating a determination result from the determination section with position information representing a position of the radiation amount detection pixel.

A sixth aspect of the present invention, in the above aspects, may further include: a plurality of imaging pixels for imaging a radiation image, each the imaging pixel including a sensor that generates charges in amounts corresponding to radiation amounts of irradiated radiation, a capacitor for accumulating the charges generated by the sensor, and a switching element connected between the capacitor and the signal line; and a control section that controls to turn the switching element ON and OFF, wherein, in a period in which the charge amplifier is accumulating the charges generated at the radiation amount detection pixel, the control section may set the switching element to the OFF state and may stop the charges generated at the imaging pixels being provided to the charge amplifier.

Namely, in the sixth aspect of the present invention, the provision of the charges generated at the imaging pixels to the charge amplifiers is stopped for the period in which the charge amplifiers accumulate the charges generated at the radiation amount detection pixels. Thus, the pixel values of the radiation amount detection pixels and the pixel values of the imaging pixels can be separated.

In a seventh aspect of the present invention, in the above aspect, after the acquisition section has acquired the first detection value and the second detection value, the control section may set the switching element to the ON state and may provide the charges generated at the imaging pixel to the charge amplifier, and the acquisition section may acquire an output value of the charge amplifier in a period in which the charge amplifier is accumulating the charges generated at the imaging pixel as a pixel value of the imaging pixel.

Namely, in the seventh aspect of the present invention, the pixel values of the radiation amount detection pixels and the pixel values of the imaging pixels can be acquired successively.

In an eighth aspect of the present invention, in the above aspects, a size of the radiation amount detection pixel may be smaller than the size of the imaging pixel.

In a ninth aspect of the present invention, in the above aspects, a plurality of the radiation amount detection pixel may be connected to the signal line, and the charges generated at each of the plurality of radiation amount detection pixels may flow together in the signal line and are provided to the charge amplifier.

A tenth aspect of the present invention is a pixel value acquisition method that acquires a pixel value of a radiation amount detection pixel of a radiation imaging device including, the radiation amount detection pixel that generates charges in amounts corresponding to radiation amounts of irradiated radiation, and a charge amplifier that accumulates charges provided from the radiation amount detection pixel via a signal line, and that outputs output signals with signal levels corresponding to accumulated charge amounts, the pixel value acquisition method including: acquiring an output value of the charge amplifier at a point in time when a first accumulation duration has passed from an accumulation at the charge amplifier of the charges generated at the radiation amount detection pixel being started, as a first detection value; acquiring an output value of the charge amplifier at a point in time when a second accumulation duration, different from the first accumulation duration, has passed from an accumulation at the charge amplifier of the charges generated at the radiation amount detection pixel being started, as a second detection value; and deriving a difference between the first detection value and the second detection value as a pixel value of the radiation amount detection pixel.

An eleventh aspect of the present invention is a non-transitory computer readable medium storing a program causing a computer to execute a process for controlling a radiation imaging device, the radiation imaging device including, a radiation amount detection pixel that generates charges in amounts corresponding to radiation amounts of irradiated radiation, and a charge amplifier that accumulates charges provided from the radiation amount detection pixel via a signal line, and that outputs output signals with signal levels corresponding to accumulated charge amounts, the process including: acquiring an output value of the charge amplifier at a point in time when a first accumulation duration has passed from an accumulation at the charge amplifier being started, as a first detection value; acquiring an output value of the charge amplifier at a point in time when a second accumulation duration, different from the first accumulation duration, has passed from an accumulation at the charge amplifier being started, as a second detection value; and deriving a difference between the first detection value and the second detection value as a pixel value of the radiation amount detection pixel.

According to the aspects of the present invention described above, pixel values of radiation amount detection pixels from which offset components caused by charge amplifiers and the like are removed and that contain only signal components based on charges generated at the radiation amount detection pixels may be acquired, by finding the differences between the second detection values and the first detection values. Therefore, the aspects of the present invention described above may acquire accurate pixel values of the radiation amount detection pixels, as a result of which the detection accuracy of defective pixels may be improved.

BRIEF DESCRIPTION OF THE DRAWINGS

Exemplary embodiments of the present invention will be described in detail based on the following figures, wherein:

FIG. 9 is a flowchart showing the flow of processing of a pixel value acquisition processing program in accordance with the exemplary embodiment of the present invention;

FIG. 10 is a timing chart showing the operations of respective sections of the electronic cassette during an execution of the pixel value acquisition processing program in accordance with the exemplary embodiment of the present invention;

FIG. 14 is a flowchart showing the flow of processing of a pixel value acquisition processing program in accordance with an alternative exemplary embodiment of the present invention; and FIG. 15 is a timing chart showing the operations of respective sections of an electronic cassette during an execution of the pixel value acquisition processing program in accordance with the alternative exemplary embodiment of the present invention.

DETAILED DESCRIPTION OF THE INVENTION

Herebelow, embodiments for carrying out the present invention are described in detail with reference to the attached drawings. Described herebelow is an example of a case in which the present invention is applied to a radiology information system, which is a system that collectively administers information managed by a radiology department in a hospital.

First Exemplary Embodiment

Figure 1:
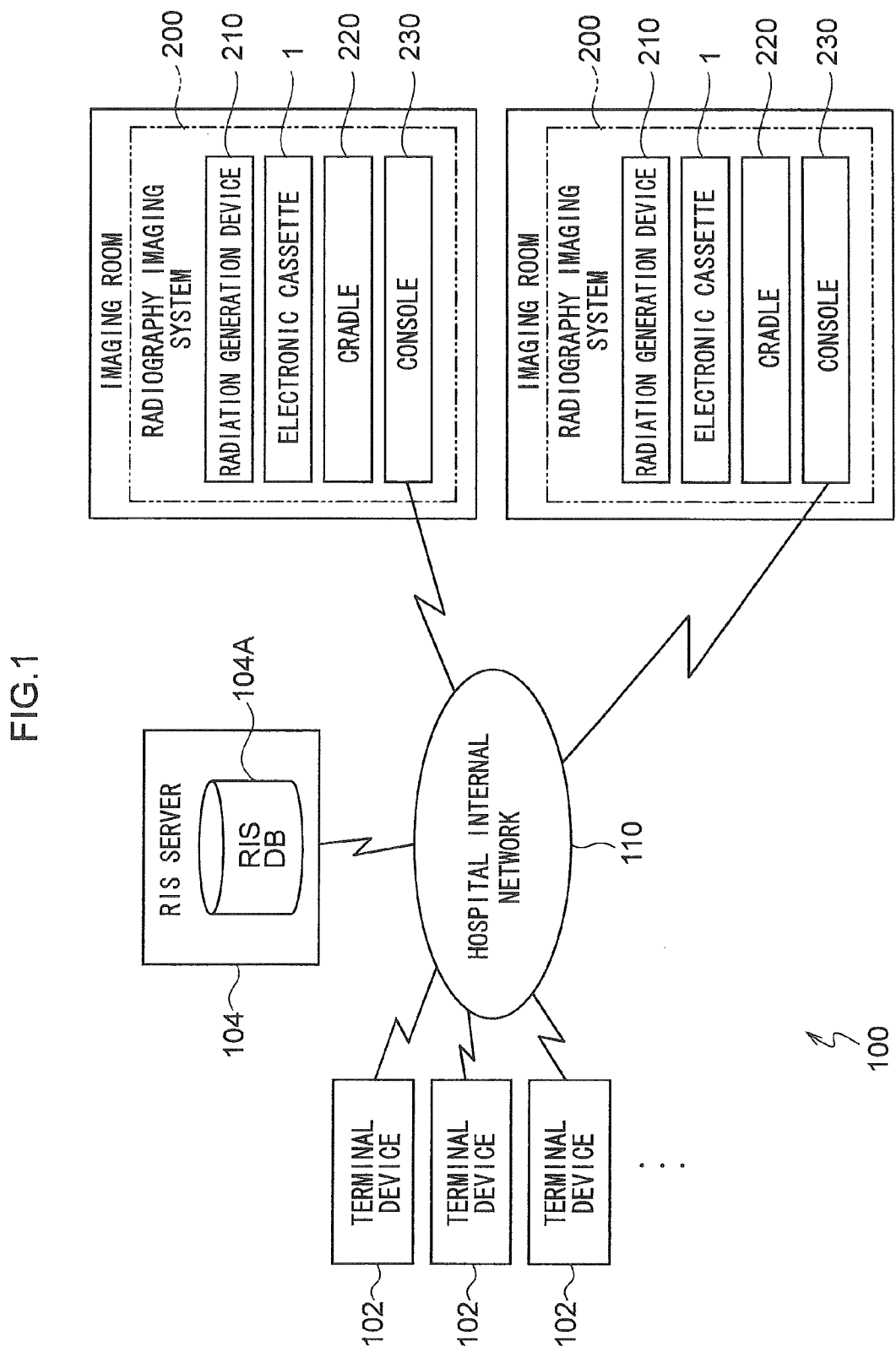
FIG. 1 is a block diagram showing the configuration of a radiology information system in accordance with an exemplary embodiment of the present invention.

FIG. 1 shows the configuration of a radiology information system (hereinafter referred to as an RIS) 100 according to an exemplary embodiment of the present invention.

The RIS 100 is a system for administering information of clinical appointments, medical records and so forth in the radiology department, and configures a portion of a hospital information system (hereinafter referred to as an HIS).

The RIS 100 is configured with a plural number of imaging request terminal devices (hereinafter referred to as terminal devices) 102, an RIS server 104 and a radiation imaging system (hereinafter referred to as an imaging system) 200, which is separately installed in a radiography imaging room (or an operating room) in the hospital, being connected to a hospital internal network 110, which is formed with a wired and/or wireless local area network (LAN) or the like. Herein, the RIS 100 configures a portion of the HIS provided in the same hospital, and an HIS server (not shown in the drawings) that administers the HIS as a whole is also connected to the hospital internal network 110.

Each terminal device 102 is for a doctor, a radiographer or the like to input and monitor clinical information, facility reservations and the like, and to make imaging requests and imaging bookings for radiation images. The terminal device 102 includes a personal computer with a display device, and is connected with the RIS server 104 via the hospital internal network 110 for communications therebetween.

The RIS server 104 receives imaging requests from the terminal devices 102 and administers an imaging schedule for radiation images at the imaging system 200. The RIS server 104 includes a database 104A.

The database 104A includes: information relating to patients, such as information on attributes (name, gender, date of birth, age, blood type, body weight, a patient identification (ID) number and so forth) of each patient (imaging subject), medical record, treatment history, previously imaged radiation images, and the like; information relating to electronic cassettes 1 used in the imaging system 200 which are described below, such as an identification number (ID information) of each electronic cassette 1 and the type, size, sensitivity, the date of first use, the number of uses, and the like; and environmental information representing environments in which the electronic cassettes 1 are used to image radiation images, which is to say environments in which the electronic cassettes 1 are employed (for example, a radiography imaging room, an operating room and the like).

The imaging system 200 carries out imaging of radiation images in response to instructions from the RIS server 104, in accordance with control by doctors, radiographers and the like. The imaging system 200 is equipped with a radiation generation device 210, which includes a radiation source 211 (see FIG. 2) that irradiates radiation such as X-rays or the like, with radiation amounts according to exposure conditions, at a patient (an imaging subject). The imaging system 200 is also equipped with the electronic cassette 1, which incorporates a radiation detector 10 (see FIG. 3), a cradle 220, which charges a battery incorporated in the electronic cassette 1, and a console 230, which controls the electronic cassette 1 and the radiation generation device 210. The radiation detector 10 absorbs radiation X that has passed through an imaging target location of the patient (imaging subject) and generates electric charges and, on the basis of the generated charge amounts, generates image information representing a radiation image.

The console 230 acquires various kinds of information contained in the database 104A from the MS server 104, stores the information in a hard disc drive (HDD) 236 (see FIG. 7), which is described below, and uses this information to control the electronic cassette 1 and the radiation generation device 202 in accordance with needs.

Figure 2:
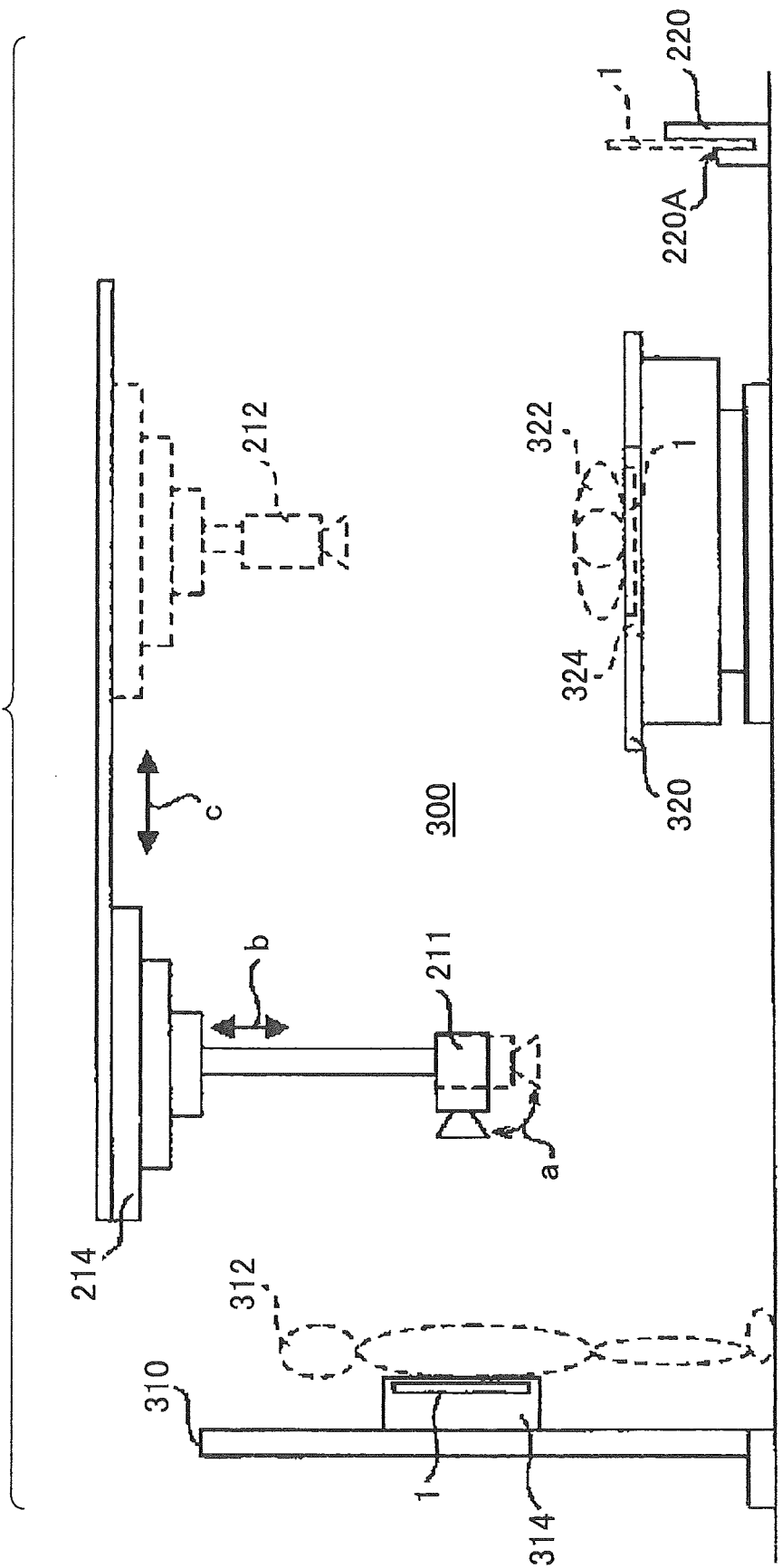
FIG. 2 is a side view showing an example of a state of arrangement of devices in a radiography imaging room of a radiation imaging system in accordance with the exemplary embodiment of the present invention.

FIG. 2 is a drawing showing an example of a state of arrangement in a radiography imaging room 300 of apparatuses that configure the imaging system 200 in accordance with the exemplary embodiment of the present invention.

As shown in FIG. 2, in the radiography imaging room 300, a standing table 310 that is used when radiation imaging is being carried out on an imaging subject in a standing position and a reclining table 320 that is used when radiation imaging is being carried out on an imaging subject in a reclining position, are provided. A space forward of the standing table 310 serves as an imaging position 312 of the patient (imaging subject) when radiation imaging is being carried out in the standing position, and a space above the reclining table 320 serves as an imaging position 322 of the patient (imaging subject) when radiation imaging is being carried out in the reclining position.

A holding section 314 that holds the electronic cassette 1 is provided at the standing table 310. When a radiation image is being imaged in the standing position, the electronic cassette 1 is held by the holding section 314. Similarly, a holding section 324 that holds the electronic cassette 1 is provided at the reclining table 320. When a radiation image is being imaged in the reclining position, the electronic cassette 1 is held by the holding section 324.

In the radiography imaging room 300, a support and movement mechanism 214 is provided that supports the radiation source 211 to be turnable (in the direction of arrow a in FIG. 2) about a horizontal axis, movable in a vertical direction (the direction of arrow b in FIG. 2) and movable in a horizontal direction (the direction of arrow c in FIG. 2). Thus, radiation imaging in both the standing position and the reclining position is possible using the single radiation source 211.

The cradle 220 includes an accommodation portion 220A capable of accommodating the electronic cassette 1. When the electronic cassette 1 is accommodated in the accommodation portion 220A of the cradle 220, the battery incorporated in the electronic cassette 1 is charged up.

In the imaging system 200, various kinds of information are exchanged by wireless communications between the radiation generation device 210 and the console 230 and between the electronic cassette 1 and the console 230.

The electronic cassette 1 is not used only in conditions in which it is retained by the holding section 314 of the standing table 310 or the holding section 324 of the reclining table 320. The electronic cassette 1 is portable, and therefore may be used in conditions in which it is not retained at a holding section, for imaging aim areas, leg areas and the like.

Figure 3:
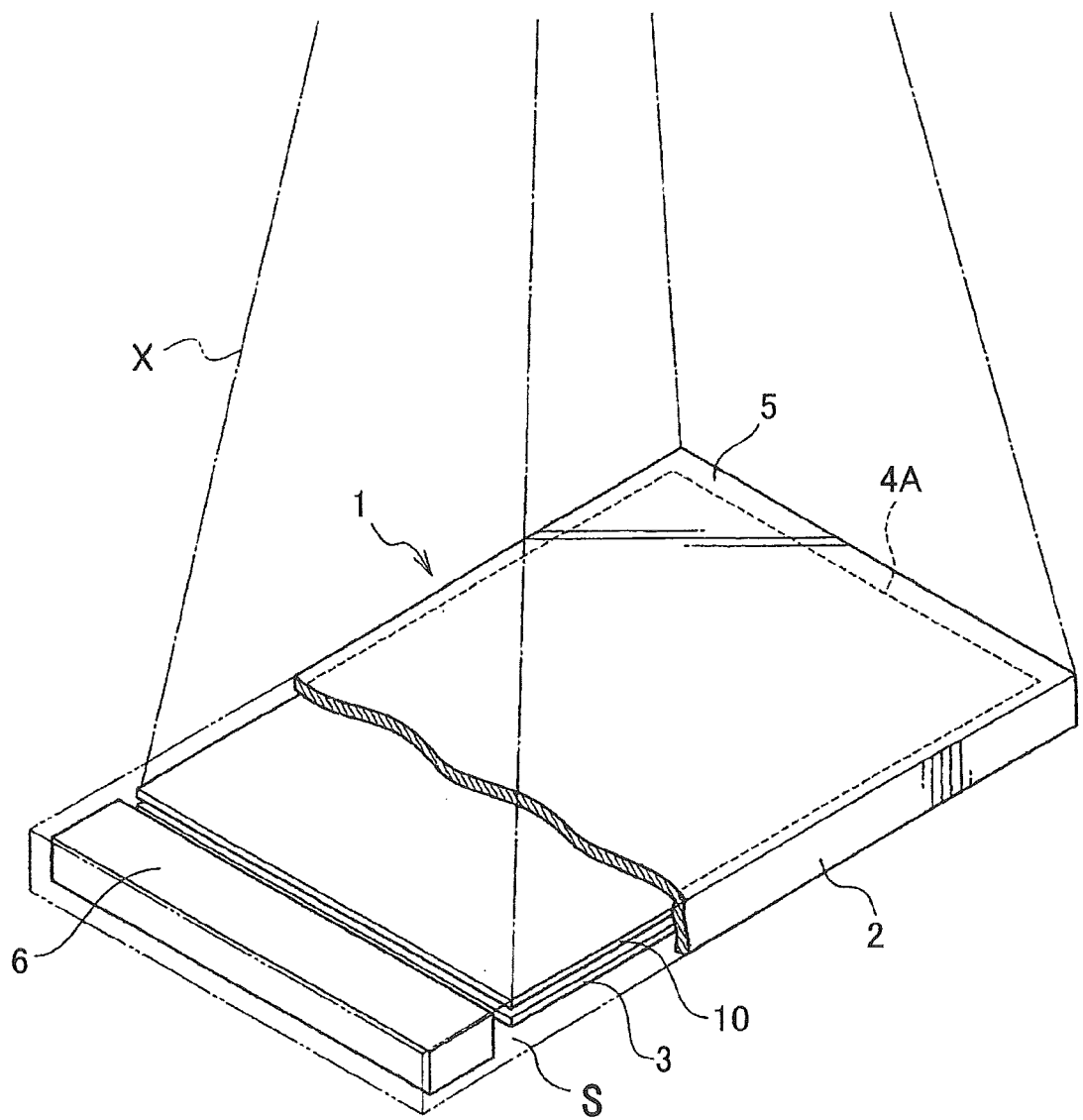
FIG. 3 is a perspective view showing configurations of an electronic cassette in accordance with the exemplary embodiment of the present invention.

Next, the configuration of the electronic cassette 1 that serves as a radiation imaging device according to the present exemplary embodiment is described. FIG. 3 is a perspective view showing configurations of the electronic cassette 1 in accordance with the exemplary embodiment of the present invention.

As shown in FIG. 3, the electronic cassette 1 is provided with a casing 2 formed of a material that transmits the radiation, and the electronic cassette 1 is fabricated to be waterproof and tightly sealed. During use in an operating room or the like, blood and saprophytic bacteria and the like may adhere to the electronic cassette 1. Accordingly, the electronic cassette 1, being fabricated to be waterproof and tightly sealed, is washed with disinfectant as required, and the individual electronic cassette 1 may be used repeatedly.

A space S that accommodates various components is formed inside the casing 2. Inside the space S, the radiation detector 10 that detects radiation X passing through the patient (imaging subject) and a lead plate 3 that absorbs back scattering of the radiation X are arranged in this order from an irradiated surface side of the casing 2 on which the radiation X is irradiated.

A region that corresponds to positions at which the radiation detector 10 is disposed is an imaging region 4A at which the radiation can be detected. A face of the casing 2 that includes the imaging region 4A is a top plate 5 of the electronic cassette 1. In the radiation detector 10 of the present exemplary embodiment, a TFT substrate 20, which is described below, is adhered to the inner side face of the top plate 5. A case 6 is disposed at one end of the interior of the casing 2. The case 6 accommodates a cassette control section 26 and a power supply section 28 (both shown in FIG. 7), which are described below, at a location that does not overlap with the radiation detector 10 (i.e., is outside the extent of the imaging region 4A).

To reduce the overall weight of the electronic cassette 1, the casing 2 is configured of, for example, carbon fiber (carbon fibers), aluminium, magnesium, bio-nanofibers (cellulose microfibrils), or a compound material or the like.

Figure 4:
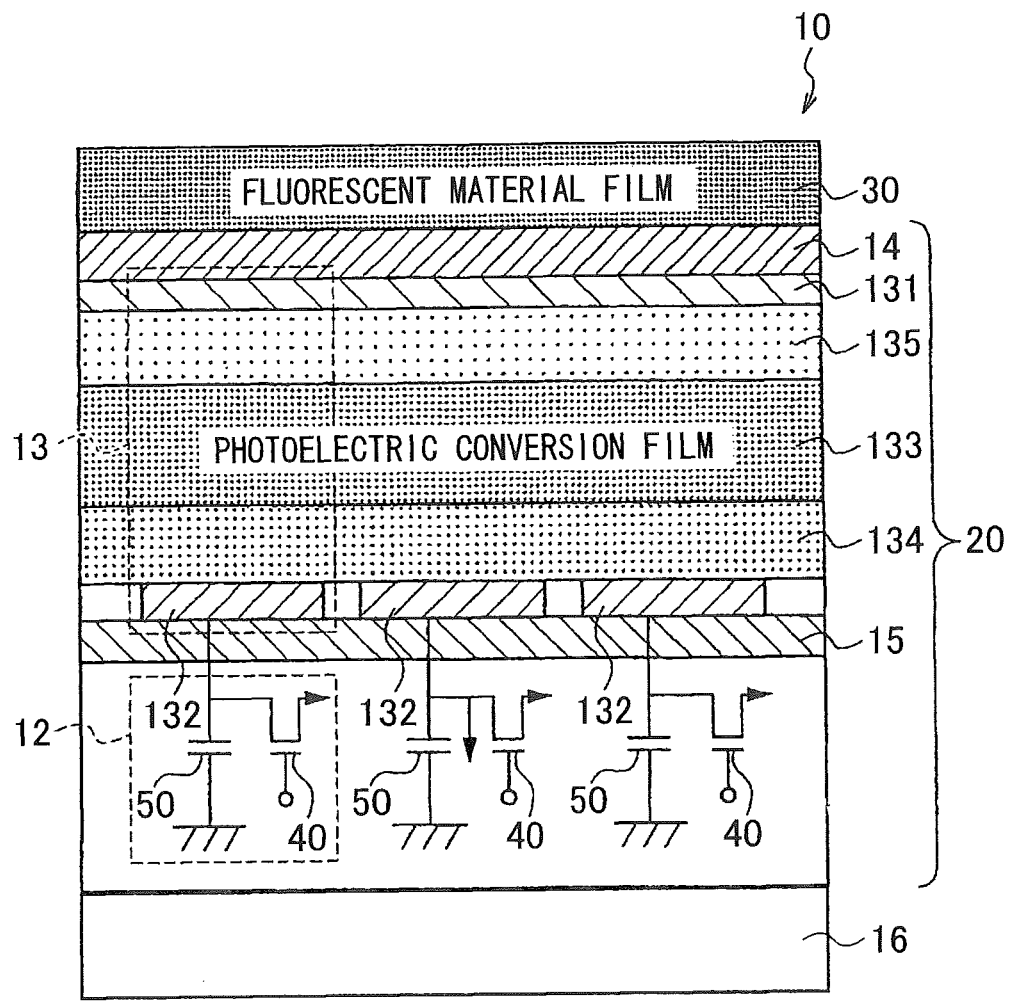
FIG. 4 is a sectional view showing schematic configuration of a radiation detector in accordance with the exemplary embodiment of the present invention.

Next, configurations of the radiation detector 10 incorporated in the electronic cassette 1 are described. FIG. 4 is a sectional diagram schematically showing the layer configuration of the radiation detector 10. The radiation detector 10 includes the TFT substrate 20 and a scintillator 30. The TFT substrate 20 is configured by sequentially forming signal output portions 12, sensor portions 13 and a transparent insulating film 14 on an insulating substrate 16. The scintillator 30 is joined to the TFT substrate 20 using an adhesive resin or suchlike with low light absorption.

The scintillator 30 is formed over the sensor portions 13 with the transparent insulating film 14 therebetween. The scintillator 30 includes a fluorescent material that converts incident radiation to light and emits the light. Namely, the scintillator 30 absorbs radiation that has passed through a patient (imaging subject) and emits light. The wavelength range of the light emitted by the scintillator 30 is preferably in the visible light range (wavelengths from 360 nm to 830 nm). To enable monochrome imaging by the radiation detector 10, it is more preferable if a green wavelength range is included. Specifically, in a case in which X-rays are used as the radiation and imaged, it is preferable to include cesium iodide (CsI) as the fluorescent material used in the scintillator 30. It is particularly preferable to use cesium iodide with thallium added thereto (CsI(Tl)), which has a light emission spectrum with a wavelength range of 420 nm to 700 nm when X-rays are irradiated thereon. CsI(Tl) has a light emission peak wavelength of 565 nm, in the visible light region.

Each sensor portion 13 includes an upper electrode 131, a lower electrode 132, and a photoelectric conversion film 133 disposed between the upper and lower electrodes. The photoelectric conversion film 133 is configured with an organic photoelectric conversion material that absorbs the light emitted by the scintillator 30 and generates charges.

Because the light generated by the scintillator 30 must be incident on the photoelectric conversion film 133, the upper electrode 131 is preferably configured with a conductive material that is transparent at least to a wavelength of light emitted from the scintillator 30. Specifically, it is preferable to use transparent conducting oxides (TCO) which have high transparency to visible light and low resistance values. A thin metal film of gold or the like may be used as the upper electrode 131. However, if the transparency is to be 90% or above, the resistance value is likely to be high. Therefore, a TCO is more preferable. For example, ITO, IZO, AZO, FTO, SnO2, TiO2, ZnO2 or the like may be preferably used. In regard to ease of processing, low resistance and transparency, ITO is the most preferable. Herein, the upper electrode 131 may be configured as a single common electrode for all pixels, or may be divided between the individual pixels.

The photoelectric conversion film 133 includes an organic photoelectric conversion material, absorbs light emitted from the scintillator 30, and generates electric charges in accordance with the absorbed light. If the photoelectric conversion film 133 includes this organic photoelectric conversion material, the film has a sharp absorption spectrum in the visible range and hardly any electromagnetic waves apart from the light emitted by the scintillator 30 are absorbed by the photoelectric conversion film 133. Thus, noise that is caused by light being emitted due to the absorption of radiation such as X-rays and the like at the photoelectric conversion film 133 may be effectively suppressed.

For the organic photoelectric conversion material constituting the photoelectric conversion film 133 to absorb the light emitted by the scintillator 30 most efficiently, it is preferable if the absorption peak wavelength of the organic photoelectric conversion material is as close as possible to the light emission peak wavelength of the scintillator 30. It is ideal if the absorption peak wavelength of the organic photoelectric conversion material and the light emission peak wavelength of the scintillator 30 match. However, provided a difference between the two is small, the light emitted from the scintillator 30 can be satisfactorily absorbed. In specific terms, it is preferable if a difference between the absorption peak wavelength of the organic photoelectric conversion material and the light emission peak wavelength of the scintillator 30 in response to the radiation is not more than 10 nm, and it is more preferable if the same is not more than 5 nm. Organic photoelectric conversion materials that may satisfy these conditions include, for example, quinacridone-based organic compounds and phthalocyanine-based organic compounds. For example, an absorption peak wavelength of quinacridone in the visible region is 560 nm. Therefore, if quinacridone is used as the organic photoelectric conversion material and CsI(Tl) is used as the material of the scintillator 30, the difference between the peak wavelengths may be kept to within 5 nm, and charge amounts generated in the photoelectric conversion film 133 may be substantially maximized.

To suppress an increase in dark current, it is preferable to provide one or other of an electron blocking film 134 and a hole blocking film 135, and it is more preferable to provide both. The electron blocking film 134 may be provided between the lower electrode 132 and the photoelectric conversion film 133. When a bias voltage is applied between the lower electrode 132 and the upper electrode 131, electrons are injected from the lower electrode 132 to the photoelectric conversion film 133. Thus, an increase in the dark current may be suppressed. An organic material with electron affinity may be used for the electron blocking film 134. The hole blocking film 135 may be provided between the photoelectric conversion film 133 and the upper electrode 131. When the bias voltage is applied between the lower electrode 132 and the upper electrode 131, holes are injected from the upper electrode 131 to the photoelectric conversion film 133. Thus, an increase in the dark current may be suppressed. An organic material with electron acceptance may be used for the hole blocking film 135.

The lower electrode 132 is plurally formed, spaced apart in the form of a grid (matrix), with one lower electrode 132 corresponding to one pixel. Each lower electrode 132 is connected to a thin film transistor (hereinafter referred to simply as a TFT) 40 and a capacitor 50 that configuration a signal output portion 12. An insulating film 15 is provided between the signal output portions 12 and the lower electrode 132, and the signal output portions 12 are formed on the insulating substrate 16. Because the radiation is to be absorbed at the scintillator 30, it is preferable if the insulating substrate 16 is a small-thickness substrate with flexibility (a substrate with a thickness of the order of several tens of μm) that has low absorption of the radiation X and is electrically insulative. Specifically, it is preferable if the insulating substrate 16 is an artificial resin, an alamide, bionanofibers, or film-form glass that can be wound into a roll (ultra-thin sheet glass).

Each signal output portion 12 is formed with the capacitor 50, which corresponds with the lower electrode 132 and accumulates charges that have migrated to the lower electrode 132, and the TFT 40, which is a switching element that converts the charges accumulated at the capacitor 50 to electronic signals and outputs the electronic signals.

The capacitor 50 is electrically connected with the corresponding lower electrode 132 via conductive wiring that is formed to penetrate through the insulating film 15. Thus, charges collected at the lower electrode 132 may be allowed to migrate to the capacitor 50. In each TFT 40, a gate electrode, a gate insulation film and an active layer (a channel layer), which are not shown in the drawings, are layered. A source electrode and a drain electrode are formed, with a predetermined gap opened therebetween, on the active layer.

In a case in which the radiation detector 10 images a radiation image with the radiation being irradiated from the side of the radiation detector 10 at which the scintillator 30 is provided, which is referred to as penetration side sampling (PSS), light is more strongly emitted from a surface side of the scintillator 30. In contrast, in a case in which the radiation detector 10 images a radiation image with the radiation being irradiated from the side of the radiation detector 10 at which the TFT substrate 20 is provided, which is referred to as irradiation side sampling (ISS), light is more strongly emitted from the side of the scintillator 30 of the face thereof that is joined to the TFT substrate 20. In a case in which the radiation detector 10 is of an ISS type, a distance between light emission positions of the scintillator 30 and the TFT substrate 20 is shorter than in a case in which the radiation detector 10 is of a PSS type. As a result, the resolution of the radiation images obtained by imaging is higher.

Figure 5:
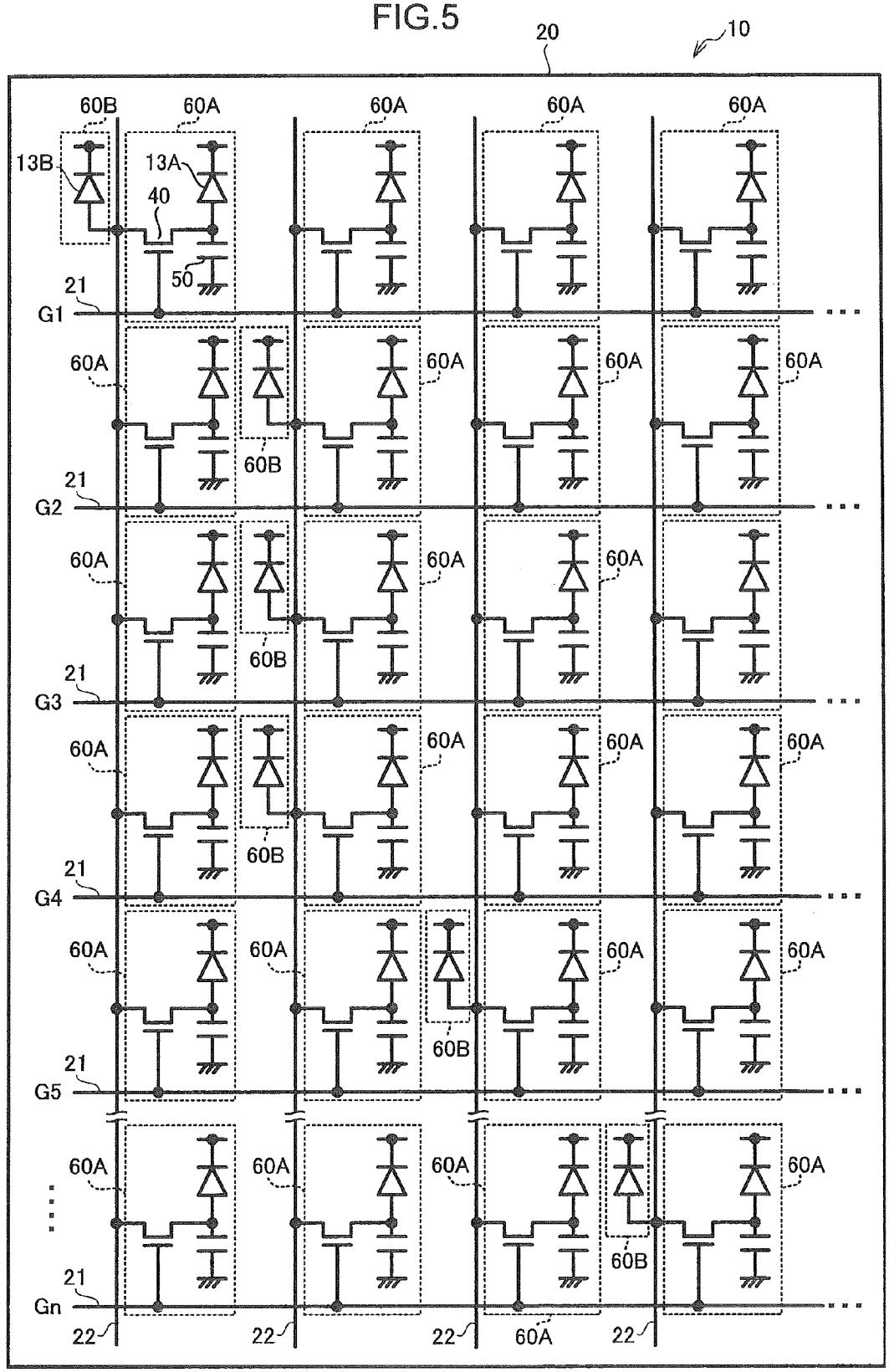
FIG. 5 is a diagram showing electronic configurations of the radiation detector in accordance with the exemplary embodiment of the present invention.

FIG. 5 is a diagram showing electronic configurations of the radiation detector 10 structuring the electronic cassette 1. The electronic cassette 1 according to the present exemplary embodiment features both a function for imaging radiation images and a radiation amount detection function that outputs radiation amount detection signals indicating when an aggregated radiation amount of the radiation irradiated at the electronic cassette 1 through the imaging subject has reached a predetermined value. The imaging system 200 according to the present exemplary embodiment features an automatic exposure control (AEC) function, and controls a radiation stop timing of the radiation from the radiation source 211 in accordance with the radiation amount detection signals outputted from the electronic cassette 1. To implement this AEC function, the radiation detector 10 includes, in addition to plural imaging pixels 60A for imaging radiation images, plural radiation amount detection pixels 60B for detecting aggregate radiation amount that has passed through the imaging subject and been irradiated onto the electronic cassette 1.

As shown in FIG. 5, each of the imaging pixels 60A includes a sensor 13A, the capacitor 50, and the TFT 40. The sensor 13A is one of the sensor portions 13 including the above-mentioned photoelectric conversion film 133 and is for imaging of radiation images. The capacitor 50 accumulates charges generated at the sensor 13A. The TFT 40 serves as a switching element that is turned ON when the charges accumulated at the capacitor 50 are to be read out. The imaging pixels 60A are arrayed two-dimensionally, forming rows and columns, over the whole area of the TFT substrate 20.

Plural gate lines 21, which are lines G1 to Gn, and plural signal lines 22 are provided in the radiation detector 10. The gate lines 21 extend in a certain direction (a row direction) along the array of the imaging pixels 60A, and are for providing gate signals to the gate terminals of the TFTs 40 to turn the TFTs 40 ON and OFF. The signal lines 22 extend in a direction orthogonal to the direction in which the gate lines 21 extend (a column direction) and are for reading out the charges at the capacitors 50 via the thin film transistors 40 that have been turned ON. The respective imaging pixels 60A are provided in correspondence with intersection portions of the gate lines 21 and signal lines 22.

Each of the radiation amount detection pixels 60B is configured with a sensor 13B, which is one of the sensor portions 13 including the above-mentioned photoelectric conversion film 133 and is for radiation amount detection. The sensors 13B are directly connected to the signal lines 22, and charges generated at the sensors 13B simply flow out into the signal lines 22. The sensors 13B are disposed to be dispersed over the whole region of the TFT substrate 20. In the present exemplary embodiment, the number of the sensors 13B is smaller than the number of the sensors 13A that are for radiation imaging. In other words, the radiation amount detection pixels 60B are formed on the TFT substrate 20 at a lower density than the imaging pixels 60A. Bias voltages are supplied to the sensors 13A for radiation imaging and the sensors 13B for radiation amount detection, via bias lines that are not shown in the drawings, and charges are generated at both the sensors 13A and the sensors 13B in amounts corresponding to radiation amounts of the irradiated radiation.

Figure 6:
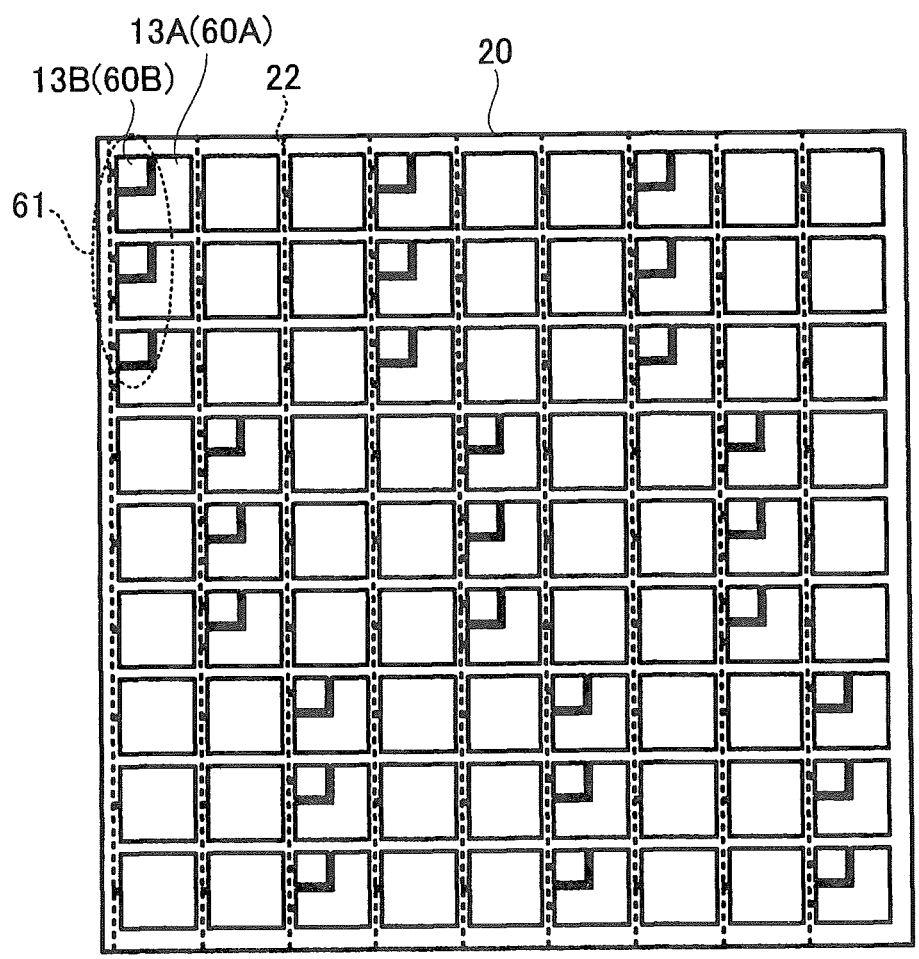
FIG. 6 is a plan view showing an example of a pattern layout of imaging pixels and radiation amount detection pixels in accordance with the exemplary embodiment of the present invention.

FIG. 6 is a plan view showing a pattern layout of the sensors 13A structuring the imaging pixels 60A and the sensors 13B structuring the radiation amount detection pixels 60B on the TFT substrate 20. In the present exemplary embodiment, the sensors 13B are formed with smaller sizes than the sensors 13A. Each of the signal lines 22 is connected to a plural number (three in the example shown in FIG. 6) of the sensors 13B (i.e., the radiation amount detection pixels 60B), which are adjacent to one another in the direction in which the signal line 22 extends. The sensors 13B (the radiation amount detection pixels 60B) are disposed to be substantially uniformly dispersed over the TFT substrate 20. In the example shown in FIG. 6, three of the sensors 13B (the radiation amount detection pixels 60B) are connected to one signal line 22, but the number of the sensors 13B (radiation amount detection pixels 60B) that are connected to the same signal line 22 may be suitably modified. Charges generated by the plural sensors 13B (radiation amount detection pixels 60B) connected to the same signal line 22 flow together in the signal line 22 and thus are added together. A pixel unit 61 is formed by the plural sensors 13B (radiation amount detection pixels 60B) that are connected to one signal line 22. In the example shown in FIG. 6, each pixel unit 61 is formed by three of the radiation amount detection pixels 60B (sensors 13B). The arrangement of the sensors 13B (the radiation amount detection pixels 60B) is not limited to the arrangement illustrated in FIG. 6; how and on which regions of the TFT substrate 20 the sensors 13B are disposed may be suitably modified.

Figure 7:
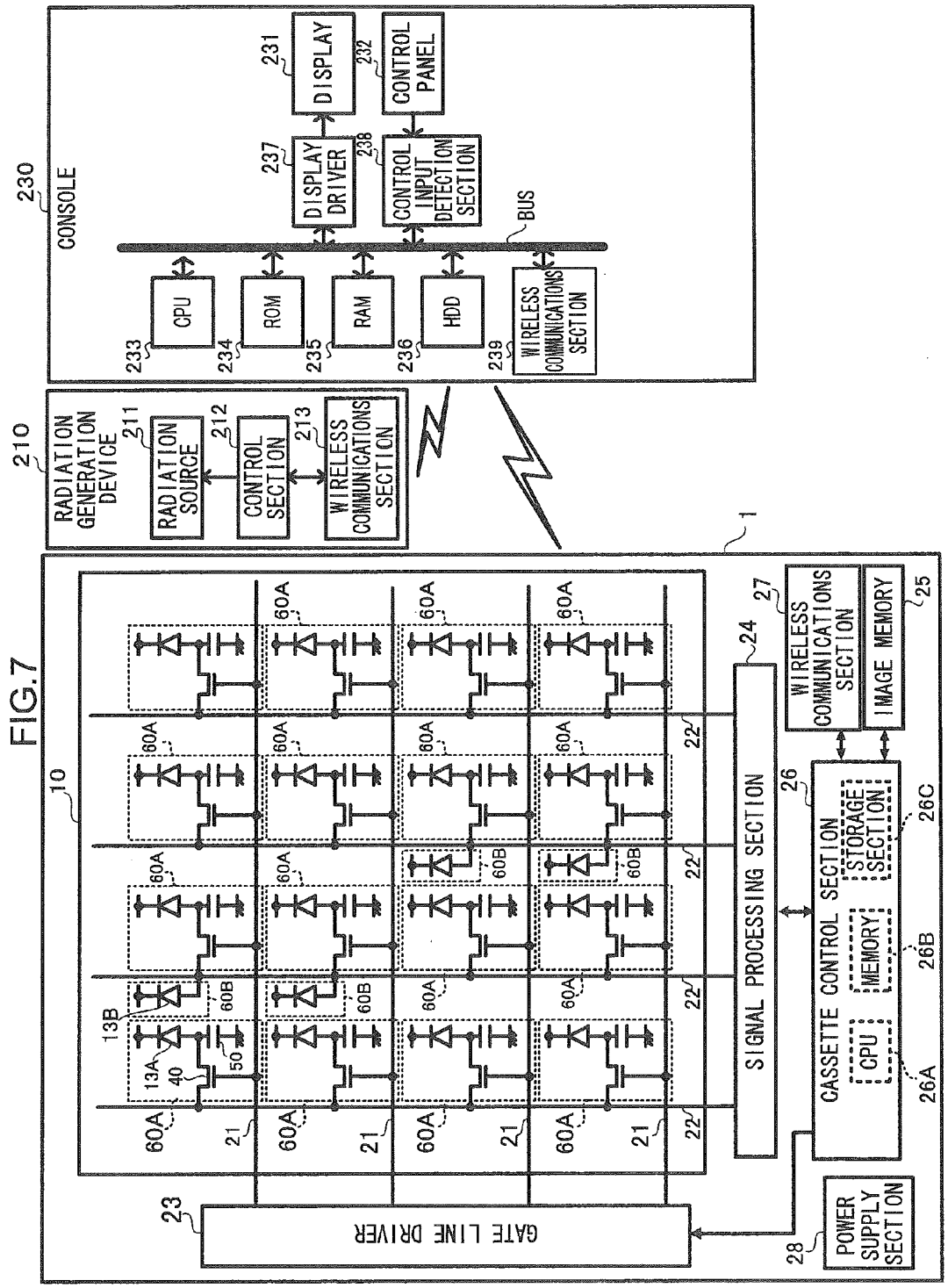
FIG. 7 is a diagram showing principal configurations of an electronic system of the imaging system in accordance with the exemplary embodiment of the present invention.

FIG. 7 is a diagram showing principal configurations of an electronic system of the imaging system 200 in accordance with the present exemplary embodiment. As shown in FIG. 7, the radiation detector 10 incorporated in the electronic cassette 1 is provided with a gate line driver 23, which is disposed at one of two adjoining sides of the radiation detector 10, and a signal processing section 24, which is disposed at the other of the two adjoining sides. The gate lines 21, the lines G1 to Gn, are connected to the gate line driver 23, and the respective signal lines 22 are connected to the signal processing section 24. The electronic cassette 1 is equipped with an image memory 25, the cassette control section 26, a wireless communications section 27 and the power supply section 28.

The TFTs 40 structuring the imaging pixels 60A are driven to be turned ON line by line by gate signals supplied from the gate line driver 23 through the lines G1 to Gn of the gate lines 21. The charges that are generated at the sensors 13A and accumulated at the capacitors 50 are read out into the signal lines 22 in the form of electronic signals by the TFTs 40 being turned ON, and are propagated to the signal processing section 24. Meanwhile, the charges generated at the sensors 13B structuring the radiation amount detection pixels 60B flow into the signal lines 22 and are provided to the signal processing section 24 continuously, regardless of the gate signals from the gate line driver 23.

Figure 8:
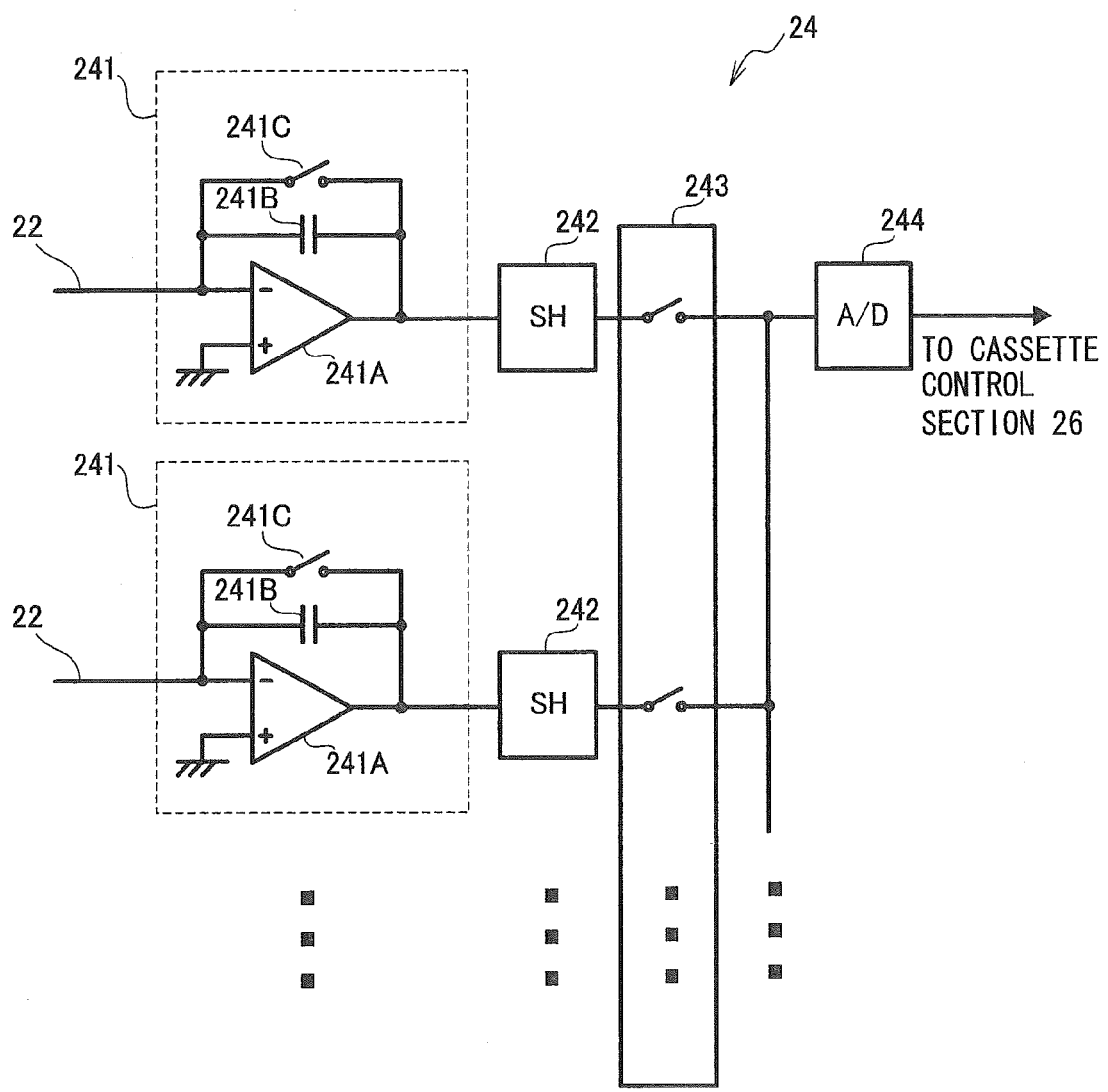
FIG. 8 is a block diagram showing configurations of a signal detection portion in accordance with the exemplary embodiment of the present invention.

FIG. 8 is a diagram showing configurations of the signal processing section 24. The signal processing section 24 includes a plural number of charge amplifiers 241 connected to the respective signal lines 22. Each of the charge amplifiers 241 includes an op amp (operational amplifier) 241A, a capacitor 241B and a reset switch 241C. The inverting input terminal of the op amp 241A is connected to the corresponding signal line 22, and the non-inverting input terminal is connected to a ground potential. One terminal of the capacitor 241B is connected to the inverting input terminal of the op amp 241A, and the other terminal is connected to the output terminal of the op amp 241A. The reset switch 241C is connected in parallel with the capacitor 241B.

The charges generated at each of the imaging pixels 60A and radiation amount detection pixels 60B are accumulated at the capacitors 241B of the charge amplifiers 241 via the signal lines 22. Each charge amplifier 241 generates electronic signals with signal levels corresponding to charge amounts accumulated at the capacitor 241B, and provides the electronic signals to a sample and hold circuit 242. The charges accumulated at the capacitor 241B can be discharged by the reset switch 241C being turned ON in accordance with control signals provided from the cassette control section 26. Thus, the electronic signals outputted from the charge amplifier 241 are reset.

The sample and hold circuit 242 samples and retains signal levels of the output signals from the charge amplifier 241 in accordance with control signals provided from the cassette control section 26, and provides the retained signal levels to a multiplexer 243.

The multiplexer 243 sequentially selects and outputs the signal levels retained at the sample and hold circuits 242 in accordance with control signals provided from the cassette control section 26. Namely, the multiplexer 243 converts the electronic signals from the sample and hold circuits 242 to serial data and sequentially provides the serial data to an analog/digital (A/D) converter 244.

The A/D converter 244 converts the signal levels of the electronic signals sequentially supplied from the multiplexer 243 to digital signals. Namely, the A/D converter 244 outputs pixel values of the imaging pixels 60A and the radiation amount detection pixels 60B in the form of digital signals.

The image memory 25 has a storage capacity capable of storing a predetermined number of frames of image data. Each time a radiation image is imaged, image data obtained by the imaging is sequentially stored in the image memory 25. The image memory 25 is connected to the cassette control section 26.

The cassette control section 26 supervises and controls overall operations of the electronic cassette 1. The cassette control section 26 includes a microcomputer, and is provided with a central processing section (CPU) 26A, a memory 26B including read-only memory (ROM) and random access memory (RAM), and a non-volatile storage section 26C formed of flash memory or the like. The wireless communications section 27 is connected to the cassette control section 26.

The wireless communications section 27 complies with wireless LAN (local area network) standards, typically IEEE (Institute of Electrical and Electronics Engineers) standards 802.11a/b/g and the like. The wireless communications section 27 controls transfers of various kinds of information between the cassette control section 26 and external equipment by wireless communications. The cassette control section 26 is capable of wireless communications, via the wireless communications section 27, with external devices such as the console 230 that controls the imaging of radiation images and the like, and may exchange various kinds of information with the console 230 and the like.

The electronic cassette 1 is also provided with the power supply section 28. The various circuits and components mentioned above (the gate line driver 23, the signal processing section 24, the image memory 25, the wireless communications section 27, the microcomputer that functions as the cassette control section 26, and the like) are driven by electric power supplied from the power supply section 28. The power supply section 28 incorporates a battery (a rechargeable secondary cell), so as not to impede portability of the electronic cassette 1, and supplies power to the various circuits and components from the charged battery. Wiring connecting the power supply section 28 with the various circuits and components are not shown in FIG. 7.

The console 230 is configured as a server computer, and is equipped with a display 231, which displays control menus, imaged radiation images and the like, and a control panel 232, which is configured to include plural buttons and at which various kinds of information and control instructions can be inputted.

The console 230 according to the present exemplary embodiment is equipped with: a CPU 233 that administers operations of the device as a whole; a ROM 234 at which various programs, including a control program, and suchlike are stored in advance; a RAM 235 that temporarily stores various kinds of data; the HDD 236, which stores and retains various kinds of data; a display driver 237 that controls displays of various kinds of information at the display 231; and a control input detection section 238 that detects control states of the control panel 232. The console 230 is further equipped with a wireless communications section 239 that, by wireless communications, exchanges various kinds of information such as exposure conditions and the like with the radiation generation device 210 and exchanges various kinds of information such as image data and the like with the electronic cassette 1.

The CPU 233, ROM 234, RAM 235, HDD 236, display driver 237, control input detection section 238 and wireless communications section 239 are connected to one another by a system bus. Thus, the CPU 233 may access the ROM 234, RAM 235 and HDD 236, control displays of various kinds of information at the display 231 via the display driver 237 and, via the wireless communications section 239, control the transmission and reception of various kinds of information to and from the radiation generation device 210 and the electronic cassette 1. The CPU 233 may also acquire states of control by users from the control panel 232 via the control input detection section 238.

The radiation generation device 210 is provided with the radiation source 211, a wireless communications section 213 and a control section 212. The wireless communications section 213 exchanges various kinds of information, such as the exposure conditions and the like, with the console 230. The control section 212 controls the radiation source 211 in accordance with the received exposure conditions. The control section 212 includes a microcomputer, and stores the received exposure conditions and the like. The exposure conditions received from the console 230 include information such as a tube voltage, a tube current and the like. Thus, the radiation source control section 212 causes radiation to be irradiated from the radiation source 211 in accordance with the received exposure conditions.

—Pixel Value Acquisition Processing—

Herebelow, pixel value acquisition processing for acquiring the pixel values of the radiation amount detection pixels 60B, which is executed at the electronic cassette 1 according to the present exemplary embodiment, is described. The electronic cassette 1 according to the present exemplary embodiment executes the pixel value acquisition processing at predetermined timings such as, for example, when the equipment is shipped, when the equipment is installed, during regular maintenance and the like. As a result, defective pixels are detected on the basis of the acquired pixel values of the radiation amount detection pixels 60B and a defect map is created. Namely, in the present exemplary embodiment, the pixel value accession processing is executed with the objective of creating a defect map for the radiation amount detection pixels 60B. However, the pixel values of the radiation amount detection pixels 60B that are acquired in the pixel value acquisition processing according to the present exemplary embodiment may also be used as data for various calibrations, such as gain correction.

The CPU 26A of the cassette control section 26 executes a pixel value acquisition processing program in response to operations on an operation entry portion provided at the electronic cassette 1, which is not shown in the drawings, instructions from the console 230 or the like.

FIG. 9 is a flowchart showing the flow of processing of the pixel value acquisition processing program that is executed by the CPU 26A of the cassette control section 26. This pixel value acquisition processing program is memorized in advance in a predetermined region of the storage section 26C of the cassette control section 26.

FIG. 10 is a timing chart showing the operations of respective structural sections of the electronic cassette 1 operating in accordance with the pixel value acquisition processing program. FIG. 10 shows radiation irradiation timings, timings of the gate signals provided to the lines G1, G2, G3, . . . , Gn of the gate lines 21, timings of operation of the charge amplifiers 241, and timings of sampling at the sample and hold circuits 242.

In step S11 of the pixel value acquisition processing, the CPU 26A of the cassette control section 26 provides control signals to the gate line driver 23 to carry out reset processing of dark charges accumulated at the imaging pixels 60A in a period before the irradiation of radiation from the radiation source 211 begins. In response to the control signals, the gate line driver 23 provides high-level gate signals to each of the lines G1 to Gn of the gate lines 21. Thus, in the period before irradiation of the radiation from the radiation source 211 begins, the TFTs 40 of all the imaging pixels 60A are turned ON, dark charges produced at the sensors 13A are extracted from inside the pixels, and the sensors 13A are reset. However, the reset processing may be carried out by the gate line driver 23 providing high-level gate signals to the lines G1 to Gn of the gate lines 21 sequentially in the period before the irradiation of radiation from the radiation source 211 begins, and thus turning ON the TFTs 40 connected to the lines G1 to Gn sequentially.

The CPU 26A of the cassette control section 26 proceeds from the processing of step S11 to step S12 and, to reset the charge amplifiers 241, provides control signals to the reset switches 241C of the charge amplifiers 241. In response to these control signals, the reset switch 241C of the charge amplifier 241 is driven to the ON state. Thus, in the period before the irradiation of radiation from the radiation source 211 begins, charges accumulated at the capacitors 241B of the charge amplifiers 241 are discharged, and the charge amplifiers 241 are reset. In FIG. 10, the high level corresponds to the reset switches 241C being turned ON (namely, a reset state of the charge amplifiers 241), and the low level corresponds to the reset switches 241C being turned OFF (namely, an accumulation state of the charge amplifiers 241).

In step S13, the CPU 26A of the cassette control section 26 waits for an instruction for the irradiation of radiation from the radiation source 211 to be started. The instruction for the start of the irradiation of radiation is, for example, reported from the console 230.

When the irradiation of radiation from the radiation source 211 is started, in step S14, the CPU 26A of the cassette control section 26 provides control signals to the gate line driver 23 to start charge accumulation operations at each of the imaging pixels 60A. In response to these control signals, the gate line driver 23 provides low-level gate signals to each of the lines G1 to Gn of the gate lines 21. Thus, at the timing at which the irradiation of radiation from the radiation source 211 is started, the TFTs 40 of all of the imaging pixels 60A are turned ON and switch to accumulation operations in which the charges produced at the sensors 13A in accordance with the irradiation of radiation from the radiation source 211 are accumulated at the capacitors 50 of the imaging pixels 60A.

In step S15, in parallel with the processing of step S14, the CPU 26A of the cassette control section 26 provides control signals to the reset switches 241C of the charge amplifiers 241 to start charge accumulation at each of the charge amplifiers 241. Namely, at the timing at which the irradiation of radiation from the radiation source 211 is started, the reset switch 241C of each charge amplifier 241 is driven to the OFF state in response to the control signals provided from the CPU 26A of the cassette control section 26. Thus, the charge amplifier 241 is in a state in which charge accumulation at the capacitor 241B thereof is possible. The charges that are produced at the sensors 13B of the radiation amount detection pixels 60B in accordance with the irradiation of radiation from the radiation source 211 are inputted to the charge amplifiers 241 via the signal lines 22. In the configuration of the radiation detector 10 in accordance with the present exemplary embodiment, the charges from the plural radiation amount detection pixels 60B structuring the pixel unit 61 connected to each individual signal line 22 flow together in the signal line 22 and are accumulated at the capacitor 241B of the charge amplifier 241. At this time, because the TFTs 40 are turned OFF, charges generated at the sensors 13A of the imaging pixels 60A do not flow into the signal lines 22, and only the charges generated at the sensors 13B of the radiation amount detection pixels 60B are accumulated at the capacitors 241B of the charge amplifiers 241.

In step S16, the CPU 26A of the cassette control section 26 makes a determination as to whether a first accumulation duration t1 has passed since the point in time at which the reset switches 241C of the charge amplifiers 241 were turned OFF (namely, the point at which the accumulation of charges at the capacitors 241B started).

When the CPU 26A determines that the first charging duration t1 measured from the point at which the reset switches 241C of the charge amplifiers 241 were turned OFF has passed, in step S17, the CPU 26A provides control signals to the sample and hold circuits 242. In response to these control signals, each sample and hold circuit 242 samples an output value of the charge amplifier 241 at a timing SP01, at which the first accumulation period t1 of the charge amplifier 241 has passed. The values sampled by the sample and hold circuits 242 are sequentially provided to the A/D converter 244 via the multiplexer 243, converted to digital values, and provided to the cassette control section 26.

In step S18, the CPU 26A of the cassette control section 26 stores the respective digital values of the radiation amount detection pixels 60B (the pixel units 61) provided from the A/D converter 244 in the memory 26B as respective first detection values $P_{D1}$.

In step S19, the CPU 26A of the cassette control section 26 provides control signals to the reset switch 241C of each charge amplifier 241 to carry out a reset of the charge amplifier 241. In response to these control signals, the reset switch 241C of the charge amplifier 241 is driven to the ON state. Thus, the charges accumulated at the capacitor 241B of the charge amplifier 241 are discharged and the charge amplifier 241 is reset.

In step S20, the CPU 26A of the cassette control section provides control signals to the reset switch 241C of each charge amplifier 241 to start a new accumulation of charges in the charge amplifier 241. Thus, the reset switch 241C is driven to the OFF state, and charge accumulation at the capacitor 241B of each charge amplifier 241 is started again. At this time, the TFTs 40 stay in the OFF state. Therefore, charges generated at the sensors 13A of the imaging pixels 60A do not flow into the signal lines 22, and only the charges generated at the sensors 13B of the radiation amount detection pixels 60B are accumulated at the capacitors 241B of the charge amplifiers 241.

In step S21, the CPU 26A of the cassette control section 26 makes a determination as to whether a second accumulation duration t2 has passed since the point in time at which the reset switches 241C of the charge amplifiers 241 were turned OFF (namely, the point at which the accumulation of charges at the capacitors 241B started). In the present exemplary embodiment, the second accumulation duration t2 is set to a significantly longer duration than the first accumulation duration t1. However, the second accumulation duration t2 may be set to be shorter than the first accumulation duration t1.

When the CPU 26A determines that the second charging duration t2 measured from the point at which the reset switches 241C of the charge amplifiers 241 were turned OFF has passed, in step S22, the CPU 26A provides control signals to the sample and hold circuits 242. In response to these control signals, each sample and hold circuit 242 samples an output value of the charge amplifier 241 at a timing SP02, at which the second accumulation period t2 of the charge amplifier 241 has passed. The values sampled by the sample and hold circuits 242 are sequentially provided to the A/D converter 244 via the multiplexer 243, converted to digital values, and provided to the cassette control section 26.

In step S23, the CPU 26A of the cassette control section 26 stores the respective digital values of the radiation amount detection pixels 60B (the pixel units 61) provided from the A/D converter 244 in the memory 26B as respective second detection values $P_{D2}$.

In step S24, the CPU 26A of the cassette control section 26 reads out the first detection value $P_{D1}$ and second detection value $P_{D2}$ acquired for each of the radiation amount detection pixels 60B (the pixel units 61). Then the CPU 26A subtracts the corresponding first detection value $P_{D1}$ from each second detection value $P_{D2}$, deriving a result that is to serve as a pixel value $P_D$ for the respective radiation amount detection pixel 60B (pixel unit 61). Namely, the CPU 26A calculates respective pixel values $P_D$ for the radiation amount detection pixels 60B (the pixel units 61) by deriving $P_D = P_{D2} - P_{D1}$.

In step S25, the CPU 26A of the cassette control section 26 stores the calculated pixel values $P_D$ for the respective radiation amount detection pixels 60B (the pixel units 61) in the memory 26B. The performance of the above processing completes the present routine.

Figure 11A:
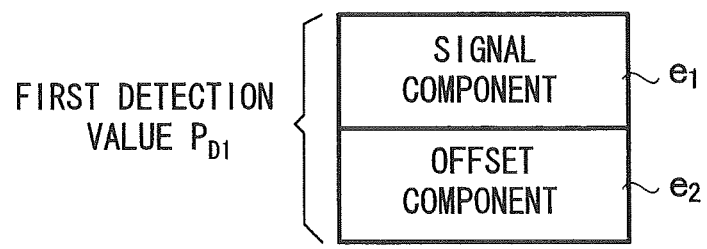
FIG. 11A is a diagram schematically showing components of a first detection value $P_{D1}$ in accordance with the exemplary embodiment of the present invention.
Figure 11B:
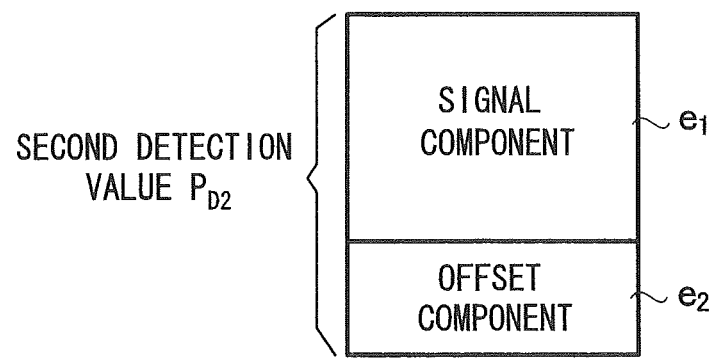
FIG. 11B is a diagram schematically showing components of a second detection value $P_{D2}$ in accordance with the exemplary embodiment of the present invention.

FIG. 11A is a diagram schematically showing components of each first detection value $P_{D1}$ acquired on the basis of the output value of the charge amplifier 241 after the first accumulation duration t1. The first detection value $P_{D1}$ includes a signal component $e_1$ that is based on charges generated at the radiation amount detection pixel 60B (pixel unit 61) and an offset component $e_2$ caused by various devices including the charge amplifier. FIG. 11B is a diagram schematically showing components of each second detection value $P_{D2}$ acquired on the basis of the output value of the charge amplifier 241 after the second accumulation duration t2. Similarly to the first detection value $P_{D1}$, the second detection value $P_{D2}$ includes the signal component $e_1$ based on charges generated at the radiation amount detection pixel 60B (pixel unit 61) and the offset component $e_2$ caused by various devices including the charge amplifier.

The size of the signal component $e_1$ is dependent on the length of the accumulation duration at the charge amplifier 241. Therefore, because the second accumulation duration t2 is longer than the first accumulation duration t1 in the present exemplary embodiment, the size of the signal component $e_1$ of the second detection value $P_{D2}$ is larger than the size of the signal component $e_1$ of the first detection value $P_{D1}$. In contrast, the size of the offset component $e_2$ is not dependent on the length of the accumulation duration of the charge amplifier 241. Therefore, the size of the offset component $e_2$ is substantially the same in the first detection value $P_{D1}$ and the second detection value $P_{D2}$.

Figure 11C:
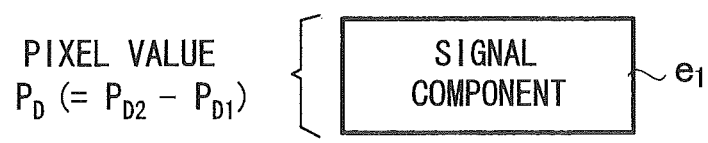
FIG. 11C is a diagram schematically showing the component of a pixel value of a radiation amount detection pixel in accordance with the exemplary embodiment of the present invention.

FIG. 11C is a diagram schematically showing the components of each pixel value $P_D$ of the radiation amount detection pixels 60B (each pixel unit 61) acquired by the above-described pixel value acquisition processing according to the present exemplary embodiment. In the pixel value acquisition processing according to the present exemplary embodiment, the difference between the first detection value $P_{D1}$ and the second detection value $P_{D2}$ that each include the signal component $e_1$ and the offset component $e_2$ is derived to be the pixel value $P_D$ of the radiation amount detection pixel 60B (the pixel unit 61). As mentioned above, the size of the offset component $e_2$ is substantially the same in the first detection value $P_{D1}$ and the second detection value $P_{D2}$, whereas the size of the signal component $e_1$ is larger in the second detection value $P_{D2}$ than in the first detection value $P_{D1}$. Therefore, the offset component $e_2$ is removed by the processing of subtracting the first detection value $P_{D1}$ from the second detection value $P_{D2}$, and just the signal component $e_1$ is obtained, with a size corresponding to the difference between the first accumulation duration t1 and the second accumulation duration t2.

Thus, according to the electronic cassette 1 in accordance with the present exemplary embodiment, because the TFTs 40 are turned OFF when the first detection values $P_{D1}$ and the second detection values $P_{D2}$ are being acquired, mixing of signal components based on charges generated at the imaging pixels 60A into the first and second detection values $P_{D1}$ and $P_{D2}$ may be prevented. Namely, in the electronic cassette 1 according to the present exemplary embodiment, although the imaging pixels 60A and the radiation amount detection pixels 60B are connected to the shared signal lines 22 as shown in FIG. 5, pixel values of the radiation amount detection pixels 60B and pixel values of the imaging pixels 60A may be separated, and pixel values of the radiation amount detection pixels 60B alone may be extracted.

Furthermore, according to the electronic cassette 1 in accordance with the present exemplary embodiment, because the difference between the first detection value $P_{D1}$ and the second detection value $P_{D2}$ based on output values of the charge amplifier 241 is derived to serve as the pixel value $P_D$ of each radiation amount detection pixel 60B (pixel unit 61), the offset component $e_2$ that is caused by various devices including the charge amplifier may be removed. Namely, according to the electronic cassette 1 in accordance with the present exemplary embodiment, just signal components based on charges generated at the radiation amount detection pixels 60B may be obtained. Therefore, even in a case in which the radiation amount detection pixels 60B (the sensors 13B) are formed with a smaller size than the size of the imaging pixels 60A (the sensors 13A) and the pixels themselves are smaller, a reduction in signal-to-noise ratio may be suppressed and accurate pixel values may be obtained. Moreover, even in a case in which a pixel value is acquired for each of the pixel units 61 as in the present exemplary embodiment, the pixel value of each pixel unit may be acquired accurately. Thus, according to the electronic cassette 1 in accordance with the present exemplary embodiment, accurate pixel values for the radiation amount detection pixels 60B may be obtained, and the accuracy of detection of defects among the radiation amount detection pixels 60B may be improved.

In the exemplary embodiment described above, a case in which radiation is irradiated at the electronic cassette 1 and pixel values of the radiation amount detection pixels 60B are acquired, have been described. However, the pixel values may be acquired in a state in which radiation is not being irradiated. In this case, the processing of step S13 in the flowchart of FIG. 9 is skipped. In the case in which radiation is not irradiated at the electronic cassette 1, according to the pixel value acquisition processing in accordance with the present exemplary embodiment described above, signal components $e_1$ based on dark currents generated in the radiation amount detection pixels 60B may be obtained. If a defect such as a leak, a short-circuit, an open-circuit or the like occurs among the radiation amount detection pixels 60B, a change in the size of the signal component $e_1$ is apparent. Thus, defective pixels may be accurately detected even in the case in which radiation is not irradiated. However, when pixel values of the radiation amount detection pixels 60B are acquired with radiation being irradiated at the electronic cassette 1, a satisfactory signal-to-noise ratio may be assured even if the size of the radiation amount detection pixels 60B is small, and defect detection may be carried out accurately. Moreover, pixels that manifest as being defective only in a high-radiation amount range may be detected by acquiring the pixel values with radiation being irradiated.

—Defect Map Creation Processing—

The electronic cassette 1 according to the present exemplary embodiment includes a defect map creation function that creates a defect map on the basis of the pixel values acquired for the respective radiation amount detection pixels 60B (pixel units 61) by the pixel value acquisition processing described above (see FIG. 9).

Figure 12:
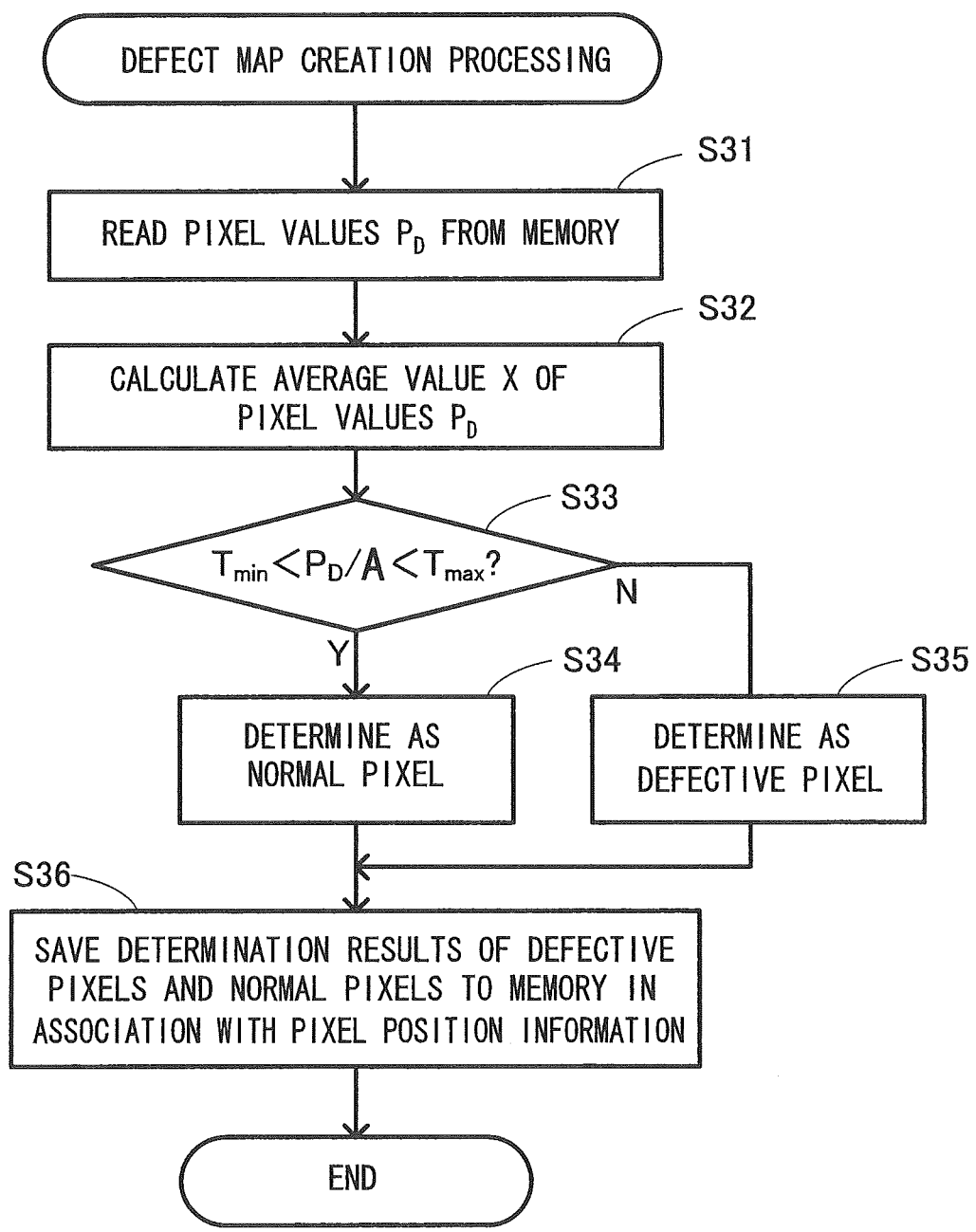
FIG. 12 is a flowchart showing the flow of processing of a defect map creation processing program in accordance with the exemplary embodiment of the present invention.

FIG. 12 is a flowchart showing the flow of processing of a defect map creation processing program that is executed by the CPU 26A of the cassette control section 26 of the electronic cassette 1. This program is memorized in advance in a predetermined region of the storage section 26C of the cassette control section 26. This program is executed, for example, after the completion of the pixel value acquisition processing described above.

In step S31, the CPU 26A of the cassette control section 26 reads out from the memory 26B the pixel values $P_D$ of the radiation amount detection pixels 60B (the pixel units 61) acquired in the pixel value acquisition processing described above (see FIG. 9).

In step S32, the CPU 26A of the cassette control section 26 calculates an average value A of the pixel values $P_D$ read out from the memory 26B.

In step S33, the CPU 26A of the cassette control section 26 calculates, for each of the radiation amount detection pixels 60B (each pixel unit 61), a ratio $P_D/A$ between the pixel value $P_D$ of the radiation amount detection pixel 60B (the pixel unit 61) and the average A calculated in step S32. Then, for each of the radiation amount detection pixels 60B (each pixel unit 61), the CPU 26A makes a determination as to whether the ratio $P_D/A$ satisfies the relationship $T_{min} \leq P_D/A \leq T_{max}$. Here, $T_{min}$ is, as an example, 0.8 and $T_{max}$ is, as an example, 1.2. In this case, the determination is made as to whether the pixel value $P_D$ is in a range from 80% to 120% of the average A. The values of $T_{min}$ and $T_{max}$ may be modified as appropriate. The CPU 26A determines that pixels (pixel units 61) for which the result of the determination in step S33 is affirmative are normal pixels (step S34) and determines that pixels (pixel units 61) for the which the result of the determination in step S33 is negative are defective pixels (step S35). Namely, pixels (pixel units 61) that output pixel values $P_D$ that deviate greatly from the average value A are judged to be defective pixels. The CPU 26A applies this defect determination to all of the radiation amount detection pixels 60B (pixel units 61).

in step S36, the CPU 26A of the cassette control section 26 saves the determination results of defective pixels or normal pixels to the memory 26B in association with position information representing the positions of those radiation amount detection pixels 60B (pixel units 61). The performance of the above processing completes the present routine.

Thus, in the electronic cassette 1 according to the present exemplary embodiment, a defect map is created on the basis of the respective pixel values $P_D$ of the radiation amount detection pixels 60B (the pixel units 61) acquired in the pixel value acquisition processing described above (see FIG. 9). According to the pixel value acquisition processing described above, because signal components based on charges generated by the imaging pixels 60A, the offset components $e_2$ and the like are removed and accurate pixel values $P_D$ are obtained, defects occurring among the radiation amount detection pixels 60B (the pixel units 61) may be accurately detected and the defect map created. In the present exemplary embodiment, the defect determination is carried out by comparing the pixel values $P_D$ of the radiation amount detection pixels 60B (the pixel units 61) with the average A of all the pixel values, but this is not limiting. For example, the defect determination may be carried out on the basis of differences from pixel values of adjacent surrounding pixels (pixel units), or the defect determination may be carried out by comparing the pixel values with pre-specified threshold values.

—Radiation Imaging Processing—

Figure 13:
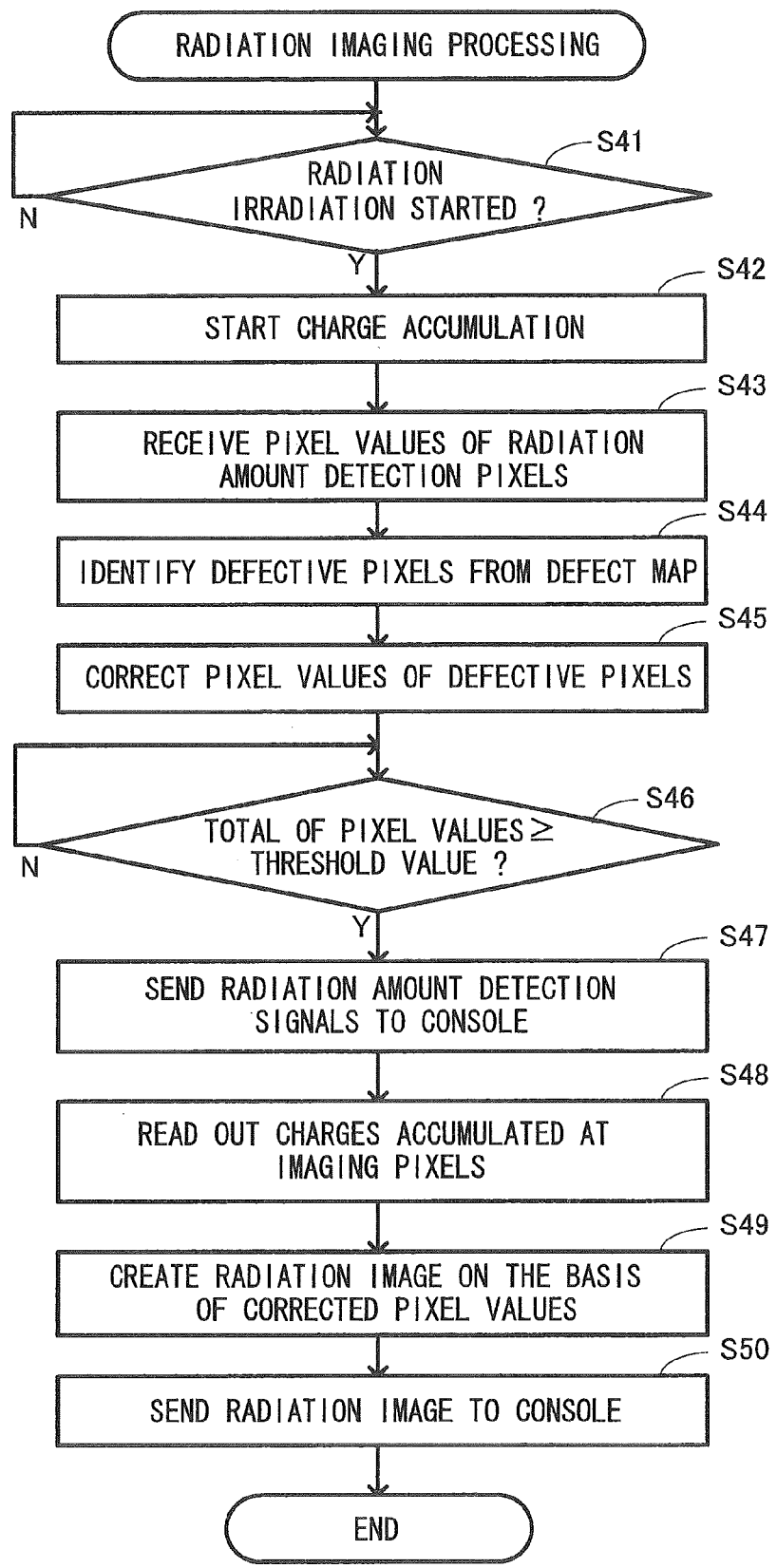
FIG. 13 is a flowchart showing the flow of processing of a radiation imaging processing program in accordance with the exemplary embodiment of the present invention.

Herebelow, radiation imaging processing for imaging a radiation image with the electronic cassette 1 according to the present exemplary embodiment is described. FIG. 13 is a flowchart showing the flow of processing of a radiation imaging processing program that is executed by the CPU 26A of the cassette control section 26 of the electronic cassette 1.

When a radiation image is to be imaged using the electronic cassette 1, an initial information input screen for the input of predetermined initial information is displayed at the display 231 of the console 230. The initial information input screen displays messages prompting the input of, for example, the name of the patient (imaging subject) of whom a radiation image is to be imaged, the imaging target location, a posture at the time of imaging, exposure conditions such as a tube voltage, tube current and the like for when the radiation is being emitted, and the like, and displays input fields for these items of initial information. An imaging operator inputs the predetermined initial information at this initial information input screen via the control panel 232.

This initial information is transmitted from the console 230 to the electronic cassette 1 via the wireless communications section 239. The exposure conditions included in this initial information are also transmitted to the radiation generation device 210 via the wireless communications section 239. Accordingly, the control section 212 of the radiation generation device 210 prepares for exposure with the received exposure conditions.

The CPU 26A of the cassette control section 26 executes the radiation imaging processing program when the CPU 26A receives the above-described initial information from the console 230. Before the execution of the radiation imaging processing program, the defect map creation processing program described above (see FIG. 12) must have been executed and the defect map of the radiation amount detection pixels 60B (the pixel units 61) memorized in the memory 26B of the cassette control section 26.

In step S41, the CPU 26A of the cassette control section 26 waits for an instruction from the console 230 that the irradiation of radiation be started. When the CPU 26A receives the radiation irradiation start instruction, the CPU 26A advances the processing to step S42.

In step S42, the CPU 26A of the cassette control section 26 starts the imaging of the radiation image using the imaging pixels 60A. Specifically, the CPU 26A provides control signals to the gate line driver 23 to turn all of the TFTs 40 OFF. Thus, at the imaging pixels 60A, an accumulation of charges generated in accordance with the irradiation of radiation begins, and the imaging pixels 60A switch into the operation of imaging the radiation image. Meanwhile, charges that are generated at each of the radiation amount detection pixels 60B in accordance with the irradiation of radiation are provided to the signal processing section 24 via the signal lines 22. In the electronic cassette 1 according to the present exemplary embodiment, the charges from the plural radiation amount detection pixels 60B structuring the pixel unit 61 connected to each individual signal line 22 flow together in the signal line 22 and are provided to the signal processing section 24. Each charge amplifier 241 of the signal processing section 24 outputs electronic signals including signal levels corresponding to the aggregated amounts of charges generated in the pixel unit 61 to serve as pixel values of the respective pixel unit. The sample and hold circuit 242 samples the pixel values of the respective pixel unit 61 that are outputted from the charge amplifier 241 at a predetermined sampling interval. The A/D converter 244 converts the sampled pixel values, which are sequentially supplied via the multiplexer 243, to digital signals and provides the digital signals to the cassette control section 26.

In step S43, the CPU 26A of the cassette control section 26 receives the respective pixel values of the radiation amount detection pixels 60B (the pixel units 61) that are sequentially provided from the signal processing section 24.

In step S44, the CPU 26A of the cassette control section 26 reads the defect map from the memory 26B and identifies defective pixels by referring to the defect map.

In step S45, the CPU 26A of the cassette control section 26 corrects for pixel values of defective pixels among the pixel values sequentially provided from the signal processing section 24. For example, the CPU 26A corrects the pixel values of defective pixels by using the pixel values of normal pixels adjacent to the defective pixels as the pixel values of the defective pixels. For example, the pixel value of a defective pixel may be substituted with the average of a plural number of pixel values of normal pixels that are adjacent to the defective pixel. The CPU 26A of the cassette control section 26 may simply discard the pixel values of defective pixels to exclude those pixel values from consideration in the determination of the following step S46.

In step S46, the CPU 26A of the cassette control section 26 makes a determination as to whether a total of pixel values of all or a subset of the radiation amount detection pixels 60B (the pixel units 61) is above a predetermined threshold value. By this determination, the electronic cassette 1 detects when an aggregated radiation amount of radiation passing through the imaging subject and being irradiated onto the electronic cassette 1 has reached a predetermined value. When the result of the determination in this step is affirmative, the processing advances to step S47.

In step S47, the CPU 26A of the cassette control section 26 generates radiation amount detection signals representing the fact that the aggregated radiation amount of radiation irradiated onto the electronic cassette 1 has reached to or above the predetermined value, and provides the radiation amount detection signals to the console 230.

When the CPU 233 of the console 230 receives the radiation amount detection signals, the CPU 233 provides control signals instructing that the irradiation of radiation be stopped to the radiation generation device 210. When the radiation generation device 210 receives these control signals, the radiation generation device 210 stops the irradiation of radiation from the radiation source 211. Thus, automatic exposure control (AEC) that controls the timing of stopping of the irradiation of radiation from the radiation source 211 by using the radiation amount detection pixels 60B to detect aggregated radiation amounts of radiation irradiated onto the electronic cassette 1 can be implemented.

In step S48, the CPU 26A of the cassette control section 26 reads out the charges accumulated at the imaging pixels 60A and creates a radiation image. Specifically, the CPU 26A provides control signals to the gate line driver 23. In response to these control signals, the gate line driver 23 sequentially outputs high-level gate signals to the lines G1 to Gn of the gate lines 21. Thus, the TFTs 40 connected to the lines G1 to Gn of the gate lines 21 are successively turned ON, and the charges accumulated at the capacitors 50 of the imaging pixels 60A are read out into the signal lines 22. The charges that are read out are converted to digital values at the signal processing section 24 and provided to the CPU 26A.

In step S49, the CPU 26A generates image data on the basis of the respective pixel values of the imaging pixels 60A provided from the signal processing section 24, and stores this image data in the image memory 25.

In step S50, the CPU 26A reads the image data stored in the image memory 25, and transmits the image data that is read to the console 230 via the wireless communications section 27. The performance of the above processing completes the present routine.

At the console 230, the image data provided from the electronic cassette 1 is stored in the HDD 236, and the radiation image represented by this image data is displayed at the display 231. The console 230 also sends the image data to the RIS server 104 via the hospital internal network 110. The image data sent to the RIS server 104 is saved in the database 104A.

Thus, in the electronic cassette 1 according to the present exemplary embodiment, whether there is a defect is determined for each of the radiation amount detection pixels 60B (the pixel units 61) on the basis of the defect map created in the above-described defect map creation processing, and the pixel values of defective pixels are corrected using the pixel values of neighboring normal pixels. Therefore, automatic exposure control (AEC) that is based on abnormal pixel values from defective pixels can be avoided. Hence, radiation images may always be imaged with suitable exposure amounts.

Second Exemplary Embodiment

Herebelow, pixel value acquisition processing in accordance with a second exemplary embodiment of the present invention is described. In the pixel value acquisition processing according to the first exemplary embodiment described above, only pixel values of the radiation amount detection pixels 60B are acquired. In contrast, in the pixel value acquisition processing according to the present exemplary embodiment, both pixel values of the radiation amount detection pixels 60B and pixel values of the imaging pixels 60A are acquired.

FIG. 14 is a flowchart showing the flow of processing of a pixel value acquisition processing program in accordance with the second exemplary embodiment. This pixel value acquisition processing program is memorized in advance in a predetermined region of the storage section 26C of the cassette control section 26.

FIG. 15 is a timing chart showing the operations of respective sections of the electronic cassette 1 operating in accordance with the pixel value acquisition processing program according to the present exemplary embodiment. FIG. 15 shows radiation irradiation timings, timings of the gate signals provided to the lines G1, G2, G3, . . . , Gn of the gate lines 21, timings of operation of the charge amplifiers 241, and timings of sampling at the sample and hold circuits 242.

In step S61, the CPU 26A of the cassette control section 26 executes the processing of steps S11 to S25 of the pixel value acquisition processing according to the above-described first exemplary embodiment (see FIG. 9). Thus, differences between the first detection values $P_{D1}$ and the second detection values $P_{D2}$ according to the output values of the charge amplifiers after mutually different charge accumulation durations are acquired to serve as the pixel values $P_D$ of the radiation amount detection pixels 60B (the pixel units 61). After the irradiation of radiation has started, the TFTs 40 connected to the lines G1 to Gn of the gate lines 21 are turned OFF and the charges generated at the imaging pixels 60A in accordance with the irradiation of radiation are accumulated at the capacitors 50 in the pixels. Namely, the charges generated at the imaging pixels 60A are not being provided to the charge amplifiers 241 at this time.

In step S62, the CPU 26A of the cassette control section 26 waits for an instruction for the irradiation of radiation from the radiation source 211 to be stopped. This instruction for the stopping of the irradiation of radiation is, for example, reported from the console 230. In this step, when the irradiation of radiation is to stop may be determined by a determination as to whether a predetermined duration has passed from when the irradiation of the radiation was started.

After the radiation irradiation from the radiation source 211 has stopped, in step S63, the CPU 26A of the cassette control section 26 provides control signals to the reset switch 241C of each charge amplifier 241 to carry out a reset of the charge amplifier 241. In response to these control signals, the reset switch 241C of the charge amplifier 241 is driven to the ON state. Thus, the charges accumulated at the capacitor 241B of the charge amplifier 241 are discharged and the charge amplifier 241 is reset.

In step S64, the CPU 26A of the cassette control section 26 provides control signals to the gate line driver 23 and the reset switch 241C of each charge amplifier 241 in order to read out the charges generated at the imaging pixels 60A. In response to these control signals, the reset switch 241C of the charge amplifier 241 is driven to the OFF state. Thus, the charge amplifier 241 is in a state in which charge accumulation at the capacitor 241B thereof is possible. Meanwhile, in response to the control signals provided from the CPU 26A of the cassette control section 26, the gate line driver 23 provides high-level gate signals to line G1 of the gate lines 21. Thus, the TFTs 40 connected to line G1 of the gate lines 21 are turned ON, and charges accumulated at the capacitors 50 of the imaging pixels 60A connected to these TFTs 40 are read out into the signal lines 22 and are accumulated at the capacitors 241B of the charge amplifiers 241.

After charges have been accumulated at the charge amplifiers 241, the CPU 26A of the cassette control section 26 provides control signals to the sample and hold circuits 242. In accordance with these control signals, each sample and hold circuit 242 samples an output value of the charge amplifier 241 at a predetermined timing sp11 within a period in which the charge amplifier 241 is accumulating the charges generated at the respective imaging pixel 60A, to serve as a pixel value Pi of the imaging pixel 60A. The pixel values of the imaging pixels 60A sampled by the sample and hold circuits 242 are sequentially provided to the A/D converter 244 via the multiplexer 243, and converted to digital values. The CPU 26A of the cassette control section 26 stores the digitalized pixel values Pi of the imaging pixels 60A in the memory 26B.

In step S65, the CPU 26A of the cassette control section 26 makes a determination as to whether the acquisition of pixel values has been completed for all the imaging pixels 60A connected to the lines G1 to Gn of the gate lines 21. If the CPU 26A determines that the acquisition of the pixel values of all the imaging pixels 60A has been completed, the processing returns to step S63. The processing of step S63 and step S64 is repeated until the acquisition of the pixel values of all the imaging pixels 60A connected to the lines G1 to Gn of the gate lines 21 has been completed. Namely, the TFTs 40 connected to the lines G1 to Gn of the gate lines 21 are sequentially turned ON and the charges accumulated at the capacitors 50 of the imaging pixels 60A are sequentially read out. The respective pixel values Pi of the imaging pixels 60A connected to the respective lines G1 to Gn are sampled at predetermined timings sp11, sp12, sp13, ..., sp1n within respective accumulation periods at the charge amplifiers and are saved in the memory 26B. When the CPU 26A determines in step S65 that the acquisition of pixel values has been completed for all of the imaging pixels 60A, the present routine ends.

Thus, in the pixel value acquisition processing according to the present exemplary embodiment of the invention, the charges generated at the radiation amount detection pixels 60B are accumulated at the capacitors 241B of the charge amplifiers 241 within periods in which the charges generated at the imaging pixels 60A are being accumulated at the capacitors 50. Thus, an accumulation period of charges generated at the imaging pixels 60A and an accumulation period of charges generated at the radiation amount detection pixels 60B overlap, and the respective pixel values for the radiation amount detection pixels 60B and the imaging pixels 60A are sequentially acquired by sequential processing of the charges accumulated at the charge amplifiers 241 and in the pixels of the imaging pixels 60A. Therefore, compared with a case in which the pixel values are acquired by respectively separate processing routines for the imaging pixels 60A and the radiation amount detection pixels 60B, time that is spent on the acquisition of pixel values may be greatly shortened.

Similarly to the first exemplary embodiment described above, the pixel values $P_D$ of the radiation amount detection pixels 60B are acquired from the differences between the first detection values $P_{D1}$ that are acquired on the basis of output values of the charge amplifiers 241 after the first accumulation duration t1 and the second detection values $P_{D2}$ that are acquired on the basis of output values of the charge amplifiers 241 after the second accumulation duration t2, with the TFTs 40 turned OFF. Thus, signal components based on charges generated at the imaging pixels 60A and the offset components $e_2$ and the like are removed, and accurate pixel values $P_D$ may be obtained.

In the exemplary embodiments described above, a case is illustrated in which each pixel unit 61 is configured by a plural number of the radiation amount detection pixels 60B connected to the same signal line 22, and a pixel value of each pixel unit 61 is acquired. However, a configuration is possible in which only one radiation amount detection pixel 60B is connected to an individual signal line 22 and a pixel value is acquired for each individual pixel.

In the exemplary embodiments described above, a configuration is illustrated in which the sensors 13B structuring the radiation amount detection pixels 60B are directly connected to the signal lines 22. However, a configuration is possible in which, similarly to the imaging pixels 60A, the sensors 13B are connected to TFTs and timings at which charges are read out from the sensors 13B may be controlled by gate signals. In this case, a configuration is preferable in which the gate lines 21 for driving the TFTs 40 in the imaging pixels 60A and lines for driving the TFTs in the radiation amount detection pixels 60B are formed as separate systems, so that charges may be read out from the imaging pixels 60A and the radiation amount detection pixels 60B independently. Further yet, in the exemplary embodiment described above, a configuration is illustrated in which the imaging pixels 60A and the radiation amount detection pixels 60B are connected to the common signal lines 22. However, signal lines that are connected to the imaging pixels 60A and signal lines that are connected to the radiation amount detection pixels 60B may be formed as separate systems.

In the exemplary embodiments described above, a case is illustrated in which the output values of the charge amplifiers 241 are each sampled one time to acquire the first detection values $P_{D1}$ and the second detection values $P_{D2}$. However, correlated double sampling (CDS) may be implemented when acquiring each of the first detection values $P_{D1}$ and second detection values $P_{D2}$. Correlated double sampling is a technique of sampling the output of the charge amplifiers twice and acquiring differences between the sampled values in order to extract only signal values from which reading noise of the charge amplifiers is removed.

In the exemplary embodiments described above, the radiation is irradiated just once and the first accumulation duration t1 and the second accumulation duration t2 are provided in this radiation irradiation period. However, the radiation may be irradiated twice, mutually different radiation accumulation durations may be specified for these radiation irradiation periods, and the first detection values $P_{D1}$ and second detection values $P_{D2}$ may be acquired therein.

In the exemplary embodiments described above, a case in which, as shown in FIG. 6, the area of each sensor 13B structuring the radiation amount detection pixels 60B is smaller than the area of each sensor 13A structuring the imaging pixels 60A, has been described. However, the areas of the sensors 13A and 13B may be the same.

In the exemplary embodiments described above, a case in which the sensors 13A and 13B structuring the pixels 60A and 60B have constitutions that include an organic photoelectric conversion material that generates charges when receiving light generated by the scintillator 30, has been described. However, the present invention is not limited thereto. Modes are possible in which a constitution not including an organic photoelectric conversion material is employed for the sensors 13A and 13B. For example, a mode is possible in which a semiconductor such as amorphous selenium or the like is employed in the sensors 13A and 13B, and radiation is directly converted to electric charges.

In the exemplary embodiments described above, a case in which communications are conducted by wireless between the electronic cassette 1 and the console 230 and between the radiation generation device 210 and the console 230, has been described. However, the present invention is not limited thereto. For example, modes are possible in which communications are conducted by wire for one or both of these.

In the exemplary embodiments described above, a case in which the radiation amount detection pixels 60B are used for automatic exposure control (AEC), has been described. However, the radiation amount detection pixels 60B may be used for detecting the start of an irradiation of radiation from the radiation source 211. Thus, the electronic cassette 1 may itself detect the start of an irradiation of radiation even without receiving information of an instruction instructing the start of an irradiation of radiation from an external device.

In the exemplary embodiments described above, a case in which X-rays are employed as the radiation has been described, but the present invention is not limited thereto. Modes are possible in which other kinds of radiation such as gamma rays and the like are employed.

What is claimed is:

1. A radiation imaging device comprising:
    a radiation amount detection pixel that generates charges in amounts corresponding to radiation amounts of irradiated radiation;
    a charge amplifier that accumulates charges provided from the radiation amount detection pixel via a signal line, and that outputs output signals with signal levels corresponding to accumulated charge amounts;
    an acquisition section that
        acquires an output value of the charge amplifier at a point in time when a first accumulation duration has passed from an accumulation being started, as a first detection value, and that
        acquires an output value of the charge amplifier at a point in time when a second accumulation duration, different from the first accumulation duration, has passed from an accumulation being started, as a second detection value; and
    a derivation section that derives a difference between the first detection value and the second detection value as a pixel value of the radiation amount detection pixel,
    wherein the charge amplifier includes a reset switch that, in an ON state, discharges the accumulated charges from the charge amplifier and that, in an OFF state, starts the accumulation of the charges at the charge amplifier, and
    wherein the acquisition section acquires the first detection value, then puts the reset switch into the ON state, and thereafter puts the reset switch into the OFF state and acquires the second detection value.

2. The radiation imaging device according to claim 1, wherein the radiation amount detection pixel is directly connected to the signal line.

3. The radiation imaging device according to claim 1, further comprising:
    a determination section that determines whether there is a defect at the radiation amount detection pixel on the basis of the pixel value of the radiation amount detection pixel derived by the derivation section; and
    a defect map creation section that creates a defect map associating a determination result from the determination section with position information representing a position of the radiation amount detection pixel.

4. The radiation imaging device according to claim 1, further comprising:
    a plurality of imaging pixels for imaging a radiation image, each of the imaging pixel including
        a sensor that generates charges in amounts corresponding to radiation amounts of irradiated radiation,
        a capacitor for accumulating the charges generated by the sensor, and
        a switching element connected between the capacitor and the signal line; and
    a control section that controls to turn the switching element ON and OFF,
    wherein, in a period in which the charge amplifier is accumulating the charges generated at the radiation amount detection pixel, the control section sets the switching element to the OFF state and stops the charges generated at the imaging pixels being provided to the charge amplifier.

5. The radiation imaging device according to claim 4 wherein, after the acquisition section has acquired the first detection value and the second detection value, the control section sets the switching element to the ON state and provides the charges generated at the imaging pixel to the charge amplifier, and the acquisition section acquires an output value of the charge amplifier in a period in which the charge amplifier is accumulating the charges generated at the imaging pixel as a pixel value of the imaging pixel.

6. The radiation imaging device according to claim 4, wherein a size of the radiation amount detection pixel is smaller than the size of the imaging pixel.

7. The radiation imaging device according to claim 1, wherein a plurality of the radiation amount detection pixel are connected to the signal line, and the charges generated at each of the plurality of radiation amount detection pixels flow together in the signal line and are provided to the charge amplifier.

8. A pixel value acquisition method that acquires a pixel value of a radiation amount detection pixel of a radiation imaging device including, the radiation amount detection pixel that generates charges in amounts corresponding to radiation amounts of irradiated radiation, and a charge amplifier that accumulates charges provided from the radiation amount detection pixel via a signal line, and that outputs output signals with signal levels corresponding to accumulated charge amounts, the pixel value acquisition method comprising:

acquiring an output value of the charge amplifier at a point in time when a first accumulation duration has passed from an accumulation at the charge amplifier of the charges generated at the radiation amount detection pixel being started, as a first detection value;

acquiring an output value of the charge amplifier at a point in time when a second accumulation duration, different from the first accumulation duration, has passed from an accumulation at the charge amplifier of the charges generated at the radiation amount detection pixel being started, as a second detection value; and deriving a difference between the first detection value and the second detection value as a pixel value of the radiation amount detection pixel, wherein the charge amplifier includes a reset switch that, in an ON state, discharges the accumulated charges from the charge amplifier and that, in an OFF state, starts the accumulation of the charges at the charge amplifier, and wherein the acquiring the output value of the charge amplifier at a point in time when a first accumulation acquires the first detection value, then puts the reset switch into the ON state, and thereafter puts the reset switch into the OFF state and the acquiring an output value of the charge amplifier at a point in time when a second accumulation duration acquires the second detection value.

9. A non-transitory computer readable medium storing a program causing a computer to execute a process for controlling a radiation imaging device, the radiation imaging device including, a radiation amount detection pixel that generates charges in amounts corresponding to radiation amounts of irradiated radiation, and a charge amplifier that accumulates charges provided from the radiation amount detection pixel via a signal line, and that outputs output signals with signal levels corresponding to accumulated charge amounts, the process comprising:

acquiring an output value of the charge amplifier at a point in time when a first accumulation duration has passed from an accumulation at the charge amplifier being started, as a first detection value;

acquiring an output value of the charge amplifier at a point in time when a second accumulation duration, different from the first accumulation duration, has passed from an accumulation at the charge amplifier being started, as a second detection value; and deriving a difference between the first detection value and the second detection value as a pixel value of the radiation amount detection pixel, wherein the charge amplifier includes a reset switch that, in an ON state, discharges the accumulated charges from the charge amplifier and that, in an OFF state, starts the accumulation of the charges at the charge amplifier, and wherein the acquiring the output value of the charge amplifier at a point in time when a first accumulation acquires the first detection value, then puts the reset switch into the ON state, and thereafter puts the reset switch into the OFF state and the acquiring an output value of the charge amplifier at a point in time when a second accumulation duration acquires the second detection value.

* * * * *